(12) United States Patent
Trenchardl et al.

(10) Patent No.: US 7,461,952 B2
(45) Date of Patent: Dec. 9, 2008

(54) LED LANTERN ASSEMBLY

(75) Inventors: Stephen E. Trenchardl, Kingwood, TX (US); Alan Trojanowski, Dayton, TX (US)

(73) Assignee: Automatic Power, Inc., Houston, TX (US)

( * ) Notice: Subject to any disclaimer, the term of this patent is extended or adjusted under 35 U.S.C. 154(b) by 0 days.

(21) Appl. No.: 11/789,660

(22) Filed: Apr. 25, 2007

(65) Prior Publication Data

US 2008/0049422 A1     Feb. 28, 2008

Related U.S. Application Data

(60) Provisional application No. 60/839,242, filed on Aug. 22, 2006.

(51) Int. Cl.
 *F21V 29/00* (2006.01)
(52) U.S. Cl. ............... 362/294; 362/241; 362/247; 362/249; 362/373; 362/800
(58) Field of Classification Search ............ 362/547, 362/236, 237, 238, 241, 247, 249, 800, 294, 362/373
See application file for complete search history.

(56) References Cited

U.S. PATENT DOCUMENTS

| | | | |
|---|---|---|---|
| 3,829,677 A | 8/1974 | DeLlano | |
| 4,034,217 A | 7/1977 | Dumont | |
| 4,242,725 A | 12/1980 | Douma | |
| 4,388,675 A | 6/1983 | Lewin | |
| 4,747,027 A | 5/1988 | Rieger | |
| 4,992,695 A | 2/1991 | Naum | |
| 5,642,933 A * | 7/1997 | Hitora | 362/243 |
| 6,053,624 A | 4/2000 | Cronk | |
| 6,183,100 B1 * | 2/2001 | Suckow et al. | 362/35 |
| 6,585,397 B1 | 7/2003 | Ebiko | |
| 6,932,496 B2 * | 8/2005 | Rizkin et al. | 362/299 |
| 7,059,754 B2 * | 6/2006 | Lekson et al. | 362/545 |
| 7,285,903 B2 * | 10/2007 | Cull et al. | 313/500 |
| 2005/0110649 A1 * | 5/2005 | Fredericks et al. | 340/815.45 |

* cited by examiner

*Primary Examiner*—Laura Tso
(74) *Attorney, Agent, or Firm*—Elizabeth R. Hall

(57) ABSTRACT

A lighting device having multiple light emitter assemblies 10 containing a light source 22, a light source mounting block 20, a heat dissipater 30, a reflector mounting block 40 and a mirror 70 attached to the reflector mounting block 40.

29 Claims, 18 Drawing Sheets

LED LANTERN ASSEMBLY

CROSS REFERENCE TO RELATED APPLICATIONS

This application claims priority to pending U.S. Patent Application Ser. No. 60/839,242, filed Aug. 22, 2006 by inventors Stephen E. Trenchard and Alan Trojanowski and entitled "LED Lantern Assembly."

BACKGROUND OF THE INVENTION

1. Field of the Invention

The present invention relates generally to a lighting device and, more specifically, to a light source, such as a grouping of light-emitting-diodes (LEDs), in combination with heat dissipation means and a reflector assembly that reflects the light source emissions into concentrated light paths.

2. Description of the Related Art

Reliable safety lights are critical for the safety of boats to prevent accidental collisions during darkness and inclement weather. A number of attempts have been made to replace marine filament bulbs with LEDs in marine safety lights because of their relatively small power consumption and long life. Incandescent bulbs have a resistively heated incandescent tungsten filament suspended by support wires within a vacuum inside a glass bulb. As a result, they are highly susceptible to damage due to temperature variations and vibrations. The typical life of incandescent bulbs usually averages one or two thousand hours, so that they must be replaced several times a year.

LEDs, on the other hand, are more efficient than bulbs at converting electricity into light. LEDs are also durable and immune to filament breakage due to shock or vibration. Therefore, LEDs have a life span of approximately 50,000 hours versus one to two thousand hours for an incandescent bulb. This means that the bulbs do not have to be replaced nearly so often and do not require much maintenance. This is particularly important for marine lanterns that are difficult to access.

However, LEDs are not without their problems. Several of these problems are discussed in a paper entitled *Design Considerations for Reliability and Optical Performance of LED Signal Lights* given by Paul F. Mueller at the XVth IALA Conference, March 2002.

One problem is that typical low output 5 millimeter LEDs, generally used in lighting devices such as those used for marine and airport safety lights, only have a driving current ranging from about 50 to 70 milliwatts and put out insufficient lumens or candlepower to meet the 3-4 mile visibility requirement. Although it is possible to increase the optical output considerably by increasing the forward current above the nominal rated value, such an increase in forward current generally leads to premature failure due to overheating of the diode junction.

Alternatively, high-output LEDs, having a driving current of about 1-5 Watt with a high lumens output, can be used, but the heat generated by these high-output LEDs within the housing for the LEDs causes a precipitous reduction in service life for the LEDs.

Yet another approach to increasing the lumens produced by a light is to increase the efficiency of the light fixture. The lighting industry has used a parabolic reflector with fluorescent and other tubular lamps (such as those described in U.S. Pat. Nos. 4,992,695, 4,242,725, 4,388,675 and 3,829,677) to improve the efficiency of the light fixture. These patents describe lighting devices that reflect a portion of the light rays emitted from the tubular light source to form a beam of concentrated, parallel rays using a reflector having a parabolic or elliptic section.

The light sources of these devices, however, emit light rays in a full 360-degree format, as do the devices in U.S. Pat. Nos. 4,747,027, 6,053,624, 5,607,053, 4,034,217, 3,829,677, 6,585,397 B1. This 360-degree arrangement means that light rays from both the reflecting-emission side and the direct-emission side of the light source must be redirected to achieve the desired all-ray parallelism. Additional hardware (such as a diffuser or another reflector) is required to handle the light rays on the direct-emission side of these devices to achieve the all-ray parallelism. Some devices (such as U.S. Pat. Nos. 4,747,027, 6,053,624, 5,067,053, 4,388,675, 4,992,695, #4,242,725, 3,829,677, 6,585,397 B1) do not modify the paths of light rays emitted on the direct-emission side of the light source and, therefore, are not all-ray parallelism devices.

There is a need for a high-intensity lighting device with a single reflector assembly that redirects most of the light rays emitted from the light source into parallel rays towards a targeted illumination area.

There is also a need to provide a means of reducing the heat generated by a high-density lighting device.

SUMMARY OF THE INVENTION

Most embodiments of the present invention configure a light source having an optical axis with (a) a heat sink to conduct heat generated by the light source away from the light source, (b) and a reflector assembly for receiving all light rays emitted by the light source and reflecting most of the light rays into an almost parallel horizontal beam directed towards the intended illumination area.

Many embodiments of the light emitter assembly include: (a) a light source mounting block; (b) a light source mounted on the light source mounting block; (c) a heat dissipation system in communication with the light source mounting block to transfer heat away from the light source; and (d) a reflector assembly for receiving an unfocused beam of light emitted by the light source and reflecting a focused beam of light away from the reflector assembly.

A number of embodiments of the lighting device include: (a) a plurality of light emitter assemblies, wherein the light emitter assembly comprises (i) a light source mounting block, (ii) a light source mounted on the light source mounting block, (iii) a heat dissipation system in communication with the light source mounting block to transfer heat away from the light source; and (iv) a reflector assembly for receiving a plurality of light rays emitted by the light source and reflecting the light rays away from the reflector assembly; (b) a mounting surface having the light emitter assemblies equidistantly disposed on the mounting surface; and (c) an air circulation path in communication with the light emitter assemblies.

Some embodiments of the lighting device include: (a) a plurality of coaxially aligned light source units, each light source unit including (i) a plurality of light emitter assemblies, wherein each light emitter assembly has a light source mounting block, a light source mounted on the light source mounting block, and a reflector assembly having a reflective surface, whereby the reflective surface receives a plurality of light rays emitted by the light source and reflects the light rays into a substantially horizontal beam away from the reflector assembly, and (ii) a mounting surface having the light emitter assemblies equidistantly disposed about a vertical axis of the mounting surface; (b) an air circulation path in communication with the light source units; and (d) a heat dissipation system in communication with the light source mounting blocks and the air circulation path for transferring heat away from the light source.

A number of embodiments of the lighting device include a heat dissipation system having (a) a plurality of first heat pipes, wherein one first heat pipe transfers heat from the light source mounting block to the reflector assembly of each light emitter assembly, (b) a plurality of cooling fins on the light source mounting block of each light emitter assembly, wherein the cooling fins are in communication with the air circulation path, and (c) a plurality of second heat pipes, wherein one second heat pipe transfers heat from the reflector assembly of each light emitter assembly to the air circulation path.

The foregoing has outlined rather broadly several aspects of the present invention in order that the detailed description of the invention that follows may be better understood and thus is not intended to narrow or limit in any manner the appended claims which define the invention. Additional features and advantages of various embodiments of the invention will be described hereinafter which form the subject of the claims of the invention. It should be appreciated by those skilled in the art that the conception and the specific embodiment disclosed may be readily utilized as a basis for modifying or designing of the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
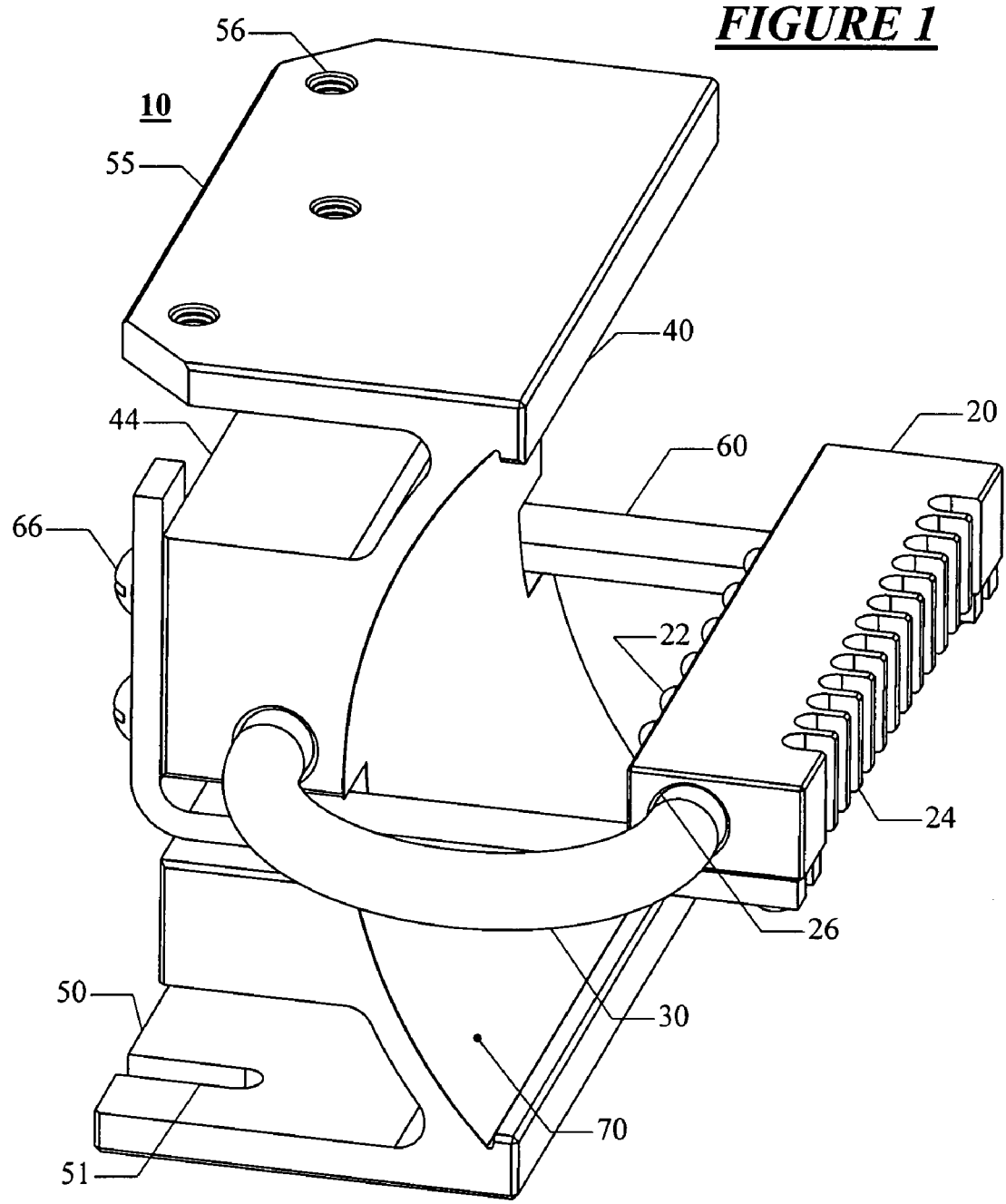
FIG. 1 is an oblique view of a light emitter assembly of the present invention.

As a note, the use of the terms "invention", "present invention" and variations thereof throughout the subject patent application (and headings therein) are intended to refer or relate to one or more embodiment of the present application, not necessarily every embodiment or claim of the application.

Referring now to the drawings, it is noted that like reference characters designate like or similar parts throughout the drawings. The figures, or drawings, are not intended to be to scale. For example, purely for the sake of greater clarity in the drawings, wall thicknesses and spacings are not dimensioned as they actually exist in the assembled embodiments. In general, only the optical surfaces are shown with no thicknesses added to represent a real mechanical system.

Figure 3:
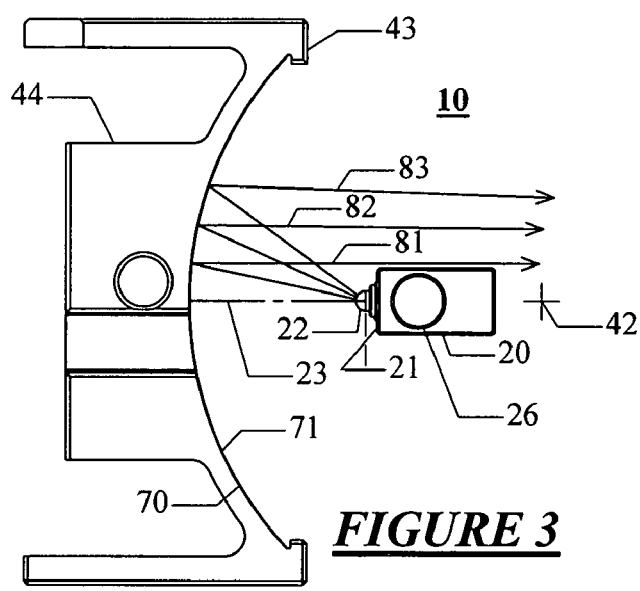
FIG. 3 is a side profile view of the light emitter assembly of FIG. 1 with the heat pipe and mounting bracket omitted for clarity. The projected path in the vertical plane of light rays reflected by the mirror is shown.
Figure 4:
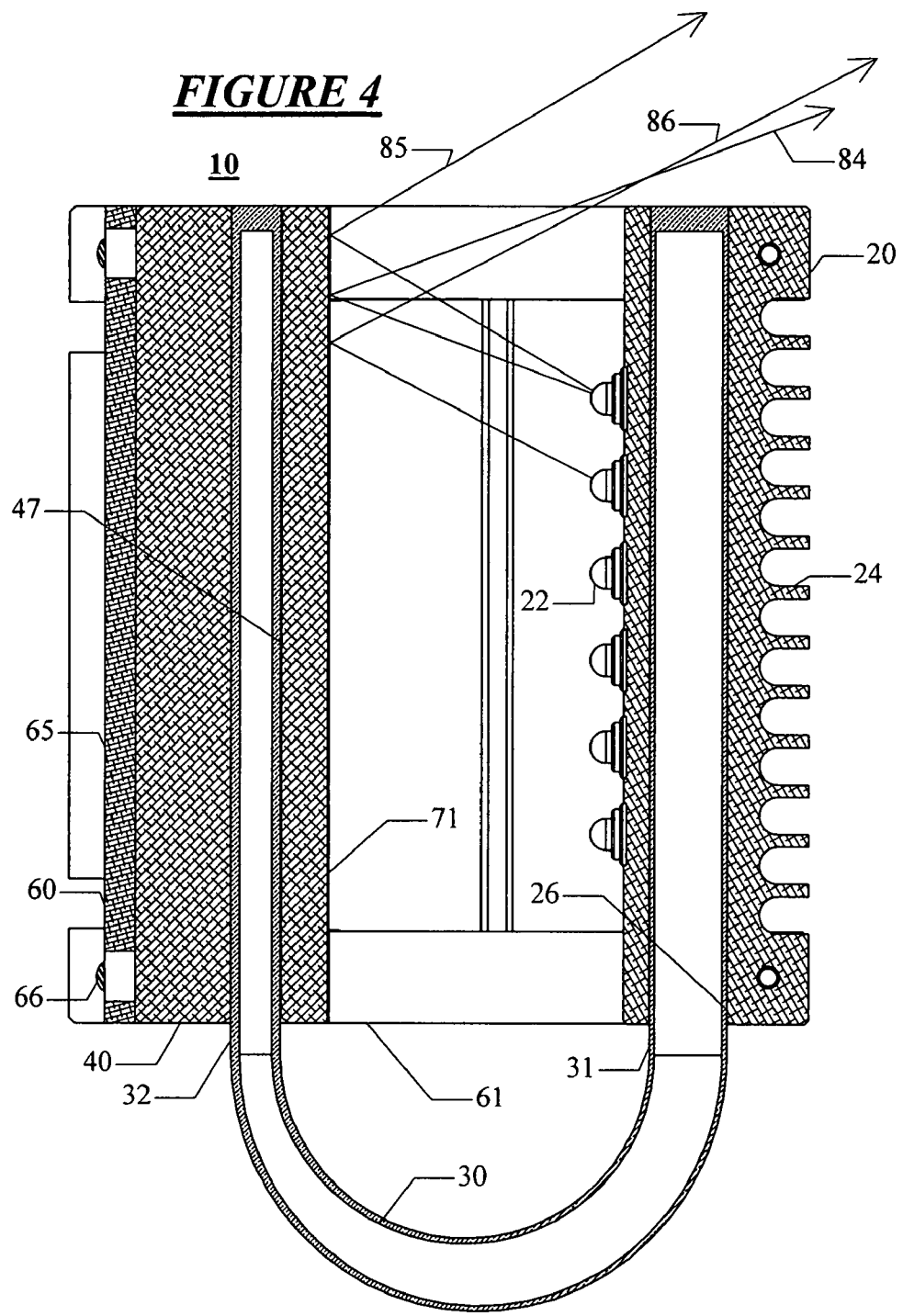
FIG. 4 is a horizontal cross-sectional view of the light emitter assembly of FIG. 1 taken on the midplane of the LEDs and the mirror, wherein the projected path in the horizontal plane of light rays reflected by the mirror is shown.

All light rays shown by way of example in FIGS. 3 and 4 are simulated ray traces created by a computer simulation system. FIGS. 3 and 4 are oriented such that the light is emitted to the left and then reflected to the right (the desired final path of the light rays). This area to the right, therefore, is referred to as the "dark side" of the light source and the area to the left as the "enlightened side" of the light source.

Multiple embodiments of the present invention are described in detail below. One embodiment of the lantern of the present invention, as shown in FIGS. 1 to 9, relates to a light-source unit 10 using at least one light emitting diode (LED) 22 installed on an LED mounting block 20 facing the main portion of a reflector assembly 40, as shown in FIGS. 1 to 4. Preferably the LED is a high-flux LED, defined herein as an LED with a driving current in excess of 1 Watt and typically about 1-5 Watts and having a high lumen output. Wide-emitting LEDs, such as those that emit light in a Lambertian or Bat Wing pattern, are one preferred type of light source for the present invention. These emission patterns are from commercially available devices and are understood by those skilled in the art.

Figure 2:
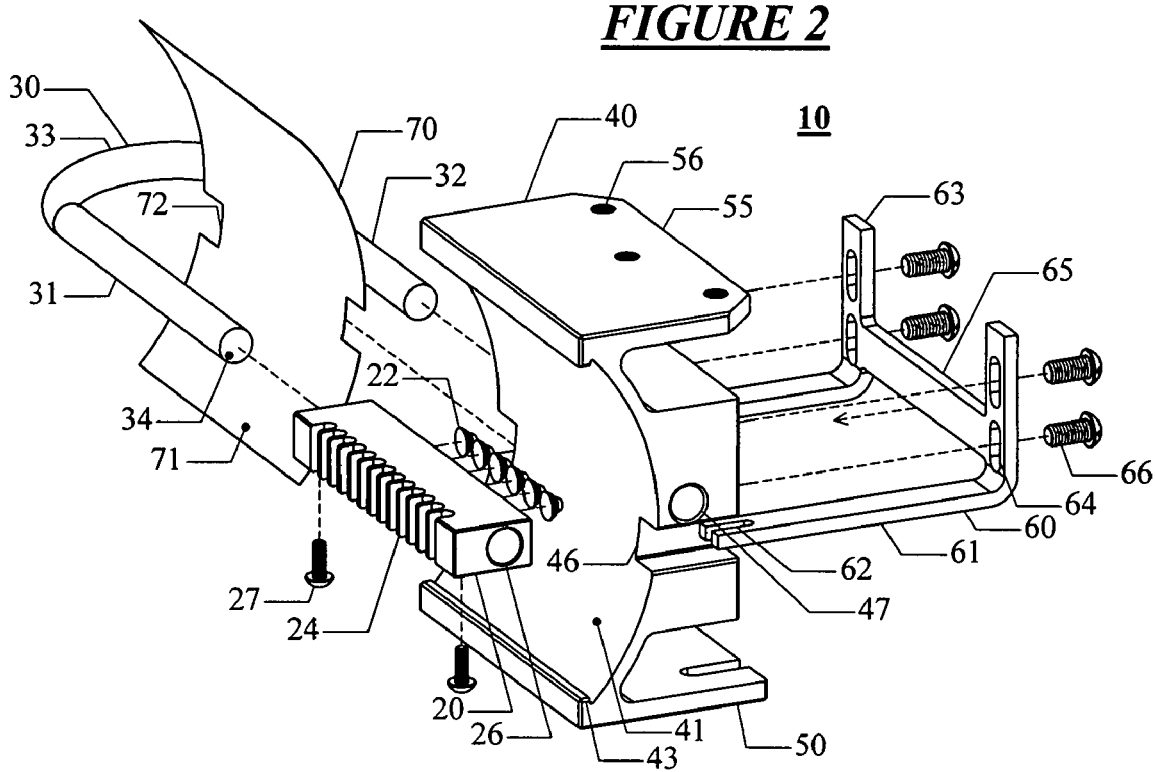
FIG. 2 is an exploded oblique view of the light emitter assembly of FIG. 1.

Referring to FIGS. 1 and 2, the first embodiment of the light emitter assembly 10 is shown in both assembled and exploded views. The primary components of the light emiter assembly are the LED mounting block 20 with its LEDs 22, the heat pipe 30, the reflector mounting block 40 with its mirror 70, and a bracket 60 for connecting the LED mounting block 20 to the reflector mounting block. In these drawings, the wiring which connects the LEDs 22 to a power supply and a power supply are not shown for clarity. However, as generally understood by those skilled in the art, a wire pair connects to each LED 22 and is run on the surface of the LED mounting block 20 and then down a horizontal arm 61 of the bracket 60 and thence to a standard DC power supply.

The LED mounting block 20 is an rectangular prismatic aluminum alloy bar having a regular array of LEDs mounted on a first horizontally extending long vertical LED mounting face 21. On the side of the mounting block 20 opposed to the LED mounting face 21 is a regular array of vertically extending slots with cooling fins 24 positioned therebetween. The LEDs 22 are attached to the mounting block 20 on the horizontal midplane of the mounting block.

The light output of each LED is substantially symmetric about a horizontal LED axis of symmetry 23 extending from the centerline of the LED normal to the mounting surface 21. The light output varies as a function of the angle of an emitted ray with the axis of symmetry. Vertical drilled and tapped holes are located on the downwardly facing side of the mounting block 20 adjacent the ends of the mounting block. These holes are threadedly engaged by the round head screws 27 used to fixedly attach the bracket 60 to the bottom of the mounting block 20. An elongate heat pipe bore 26 extends horizontally in the long direction through the entire length of mounting block 20.

Primary heat pipe 30 has a thin wall right circular cylindrical cross section and is bent into a horizontal U pattern having equal length elongated legs and a constant radius section cojoining the two legs. A first leg serves as a heat absorber end 31, while the other leg serves as a heat rejection end 32. Each leg end 31 and 32 has a transverse planar end cap 34, and elbow 33 joins the two leg ends. The internals of the heat pipe 30 are not shown here, but the heat pipe is a standard commercially available item. The heat absorber end 31 of the heat pipe 30 is inserted into the heat pipe bore 26 of the LED mounting block 20. The absorber end 31 of the heat pipe 30 is a close slip fit to the bore for the heat pipe 26 in the LED mounting block. Thermally conductive material (not shown), such as a heat sink grease, is used to fill any gap between the heat pipe 30 and the heat pipe mounting bore 26. This thermally conductive material is used to ensure efficient heat transfer from the mounting block 20 into the heat pipe 30.

Reflector mounting block 40 is cut from an extruded aluminum alloy bar by means of parallel cuts transverse to the axis of extrusion of the bar. The cross-section of the reflector mounting block 40 has on a first side of the block an arcuate face 41 having a center point 42. As shown herein, the arcuate face 41 is a right circular cylindrical face with an arc length of approximately 90 degrees symmetrical about a horizontal midplane of the extrusion. For this case, the center point 42 lies at the axis of the cylindrical arcuate face 41 and the horizontal midplane of the extrusion extends through the center point. The axis of extrusion of the reflector mounting block 40 is horizontal. At both the upper and lower edges of the arcuate face 41, radially inwardly projecting ridges constitute the retaining lips 43.

On the side of reflector mounting block 40 opposed to the arcuate face 41, a rectangular prismatic central body 44 symmetrical about the horizontal midplane of the extrusion extends horizontally from the arcuate face. The height of the central body 44 is approximately 60 percent of the height of the mounting block 40. A rectangular array of four drilled and tapped bracket attachment holes (not shown) are located near the ends on the vertical face of the central body 44 which is obverse to the arcuate face 41.

Two shallow horizontal rectangular bracket slots 46 symmetrical about the vertical midlength plane of reflector mounting block 40 are positioned below the horizontal midplane of the extrusion and extend through the transverse ends of the central body 44 and the arcuate face 41. A right circular cylindrical hole which serves as a heat pipe mounting bore 47 extends through the extrusion slightly above the horizontal midplane of the reflector mounting block 40 and between the arcuate face 41 and the opposed back face of the central body 44. The heat pipe mounting bore 47 is a close slip fit to the heat pipe 30, but thermally conductive material such as heat sink grease (not shown) is used to fill any gap between the heat pipe 30 and the heat pipe mounting bore 47.

A relatively thin rectangular cross-section lower horizontal mounting flange 50 extends away from the arcuate face 41 at the lower end of the arcuate face, and a substantially similar upper horizontal mounting flange 55 is located at the upper end of the arcuate face. The lower and upper mounting flanges, 50 and 55 respectively, extend horizontally farther than the obverse face of the central body 44. Both the mounting flanges 50 and 55 are joined to the central body 44 of the extrusion by thin right circular cylindrical section segments, and the inwardly positioned intersections of both these cylindrical segments with the flanges and the central body are filleted.

The lower mounting flange 50 has two symmetrically positioned screw slots which serve as mounting slots 51 parallel to the transverse end faces of the reflector mounting block 40 and adjacent those end faces. Centrally positioned in the lower flange 50 at midlength of the extrusion segment is a vertically extending mounting hole 52. The upper flange 55 has a pattern of three vertical mounting holes 56, wherein the two outer holes 56 are symmetrically placed and intersect the mounting slots 51 and the middle hole is coaxial with the mounting hole 52 of the lower flange 50. The three upper mounting holes 56 do not have coplanar axes.

A bracket 60 is fabricated of flat material approximately ⅛ inch thick and has the shape of a bent "H", with the bend horizontal and located below the cross bar 65 of the "H". The bracket 60 is symmetrical about a vertical plane which is coplanar with the vertical midplane of the reflector mounting block 40. The bracket 60 has two horizontal arms 61 each having a first mounting slot 62 centrally located in the distal end of the arm. The main body of the "H" is vertical, with each vertical arm 63 of the "H" having two vertically elongated second mounting slots 64. Round head bracket attachment screws 66 extend through the second mounting slots 64 and are threadedly engaged in the bracket attachment holes of the obverse face of the central body 44 of the reflector mounting block 40. With the bracket 60 thus mounted onto the vertical face opposed to arcuate face 41 of the reflector mounting block 40, the horizontal arms 61 of the bracket extend through the bracket slots 46 of the mounting block and toward the center of the arcuate face 42.

Round head light emitter mounting screws 27 extend through the first mounting slots 62 of the bracket and are threadedly engaged in the mounting holes on the lower horizontal side of the LED mounting block 20. Provision of the slots 62 and 64 permit adjustment of the position of the LED mounting block 20 so that the axes 23 of the LEDs 22 lie in the horizontal midplane of the arcuate face 41 and are perpendicular to the axis of extrusion of the reflector mounting body 40.

Mirror 70 is a flexible sheet of reflective material which is conformable to the arcuate face 41 and retained by the retainer lips 43 of the reflector mounting block 40. The construction of mirror 70 is of a planar thin foil or a sheet of uniform thickness and sufficiently high bending strength that it is not permanently distorted when bent for insertion between the retainer lips 43 of the reflector mounting block 40. For example, a Mylar film with a highly reflective metal surface applied by sputtering may be used for mirror 70. Alternatively, a highly polished metal foil that is either plated or electropolished can also be used.

The mirror 70 has its reflective face 71 on the side opposed to the side in contact with the arcuate face 41 of the reflector mounting block. The mirror 70 is provided with opposed rectangular notches 72 on its vertical transverse end faces so that clearance is provided for the horizontal arms 61 of the bracket 60. FIGS. 3 and 4 illustrate the reflection by the mirror 70 of light emitted vertically and horizontally, respectively, by the LEDs 22.

Figure 7:
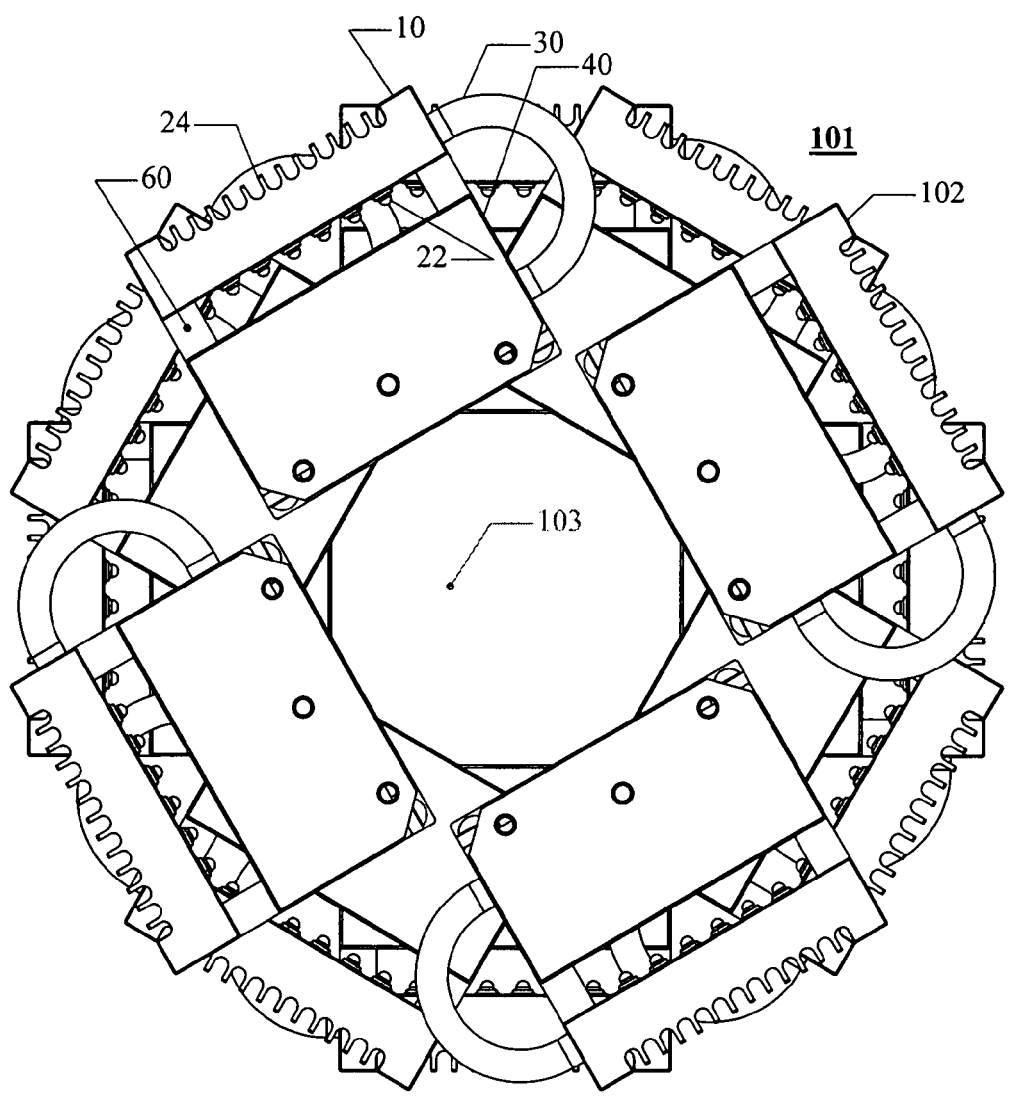
FIG. 7 is a plan view seen from the top of the light emitter unit of FIGS. 5 and 6.
Figure 20:
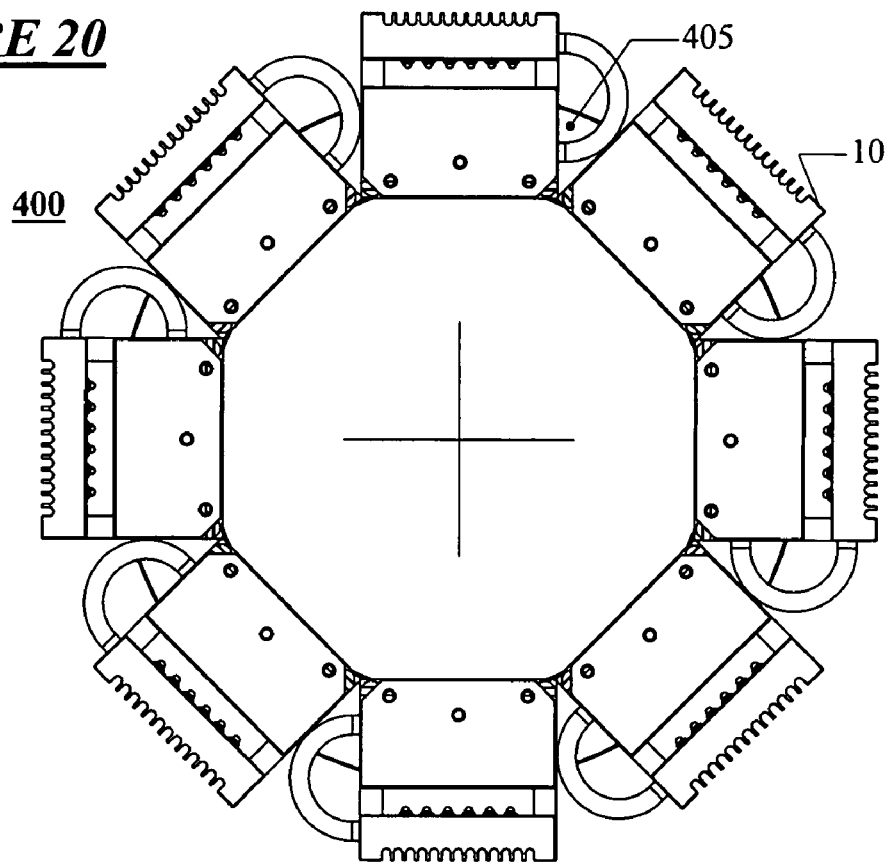
FIG. 20 shows a plan view of a single-tier light emitting system embodiment having eight light emitter units mounted on a planar annular ring.

Typically multiple lantern light emitter units can be assembled using different numbers of light emitter assemblies 10 arranged in a regular spacing about a central vertical axis, see for example FIG. 7 and FIG. 20. Such an arrangement is referred to herein as a tier. The light emitter units described herein can utilize any number of tiers, but will preferably use from one to ten tiers. Such light emitter units are suitable for use in a first embodiment of a lantern 100.

Figure 5:
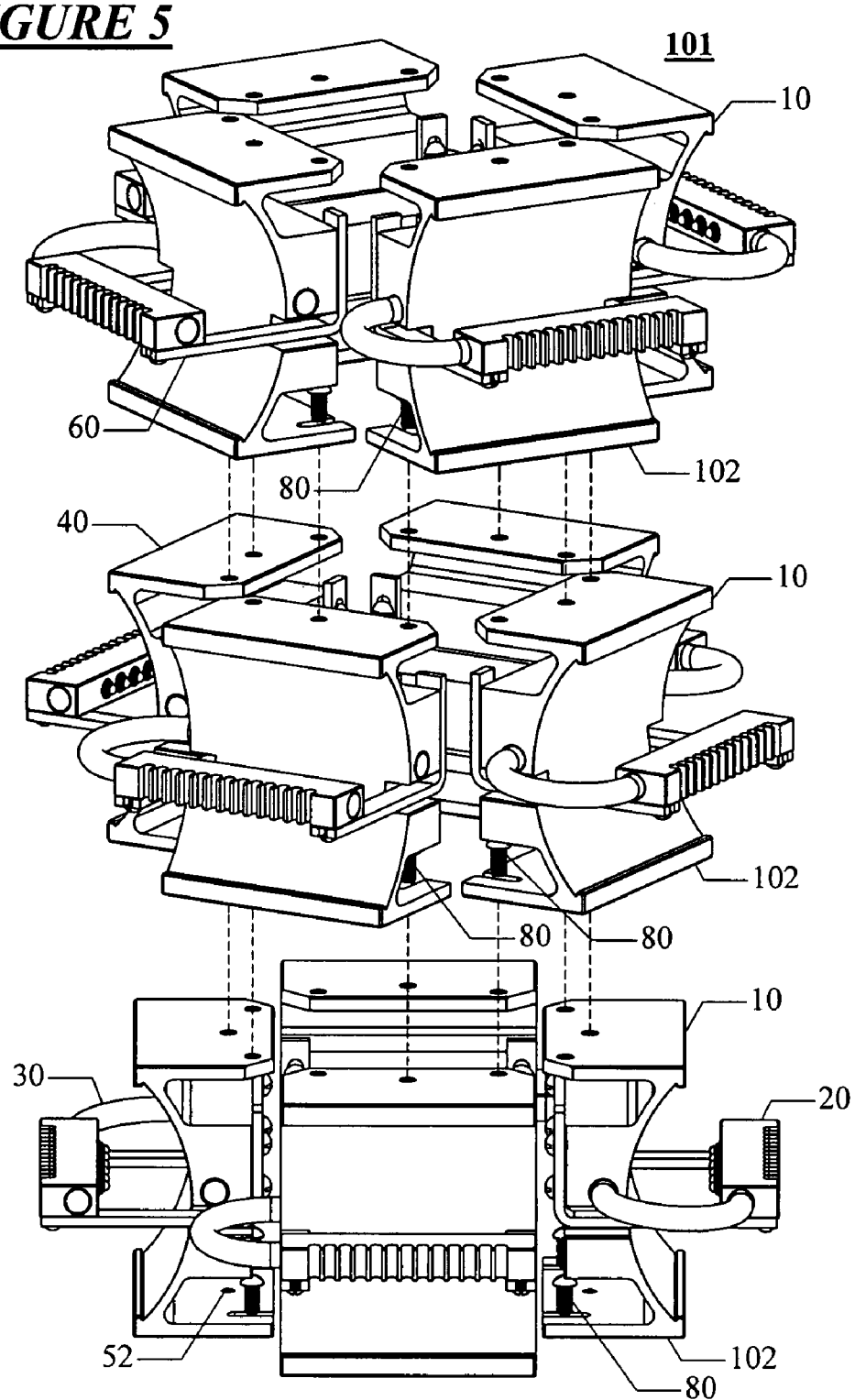
FIG. 5 is an oblique exploded view of a first embodiment of the light emitter unit which consists of multiple tiers each composed of four of the light emitter units of FIG. 1.

For example, FIG. 5 illustrates the assembly of multiple light emitter assemblies 10 into a first embodiment lantern emitter unit 101. In the lantern emitter unit embodiment 101 four of the individual light emitter assemblies 10 are arranged in a regular 90 degree spacing about a central vertical axis. Such a grouping of four of the light emitter assemblies constitutes a tier 102 of this embodiment. The light emitter assemblies 10 in a tier 102 are arranged so that their arcuate faces 41 mounting their mirrors 70 are facing outwardly and their respective vertical midplanes of symmetry intersect the central vertical axis of the grouping. As can be seen in the plan view of the lantern emitter unit 101 shown in FIG. 7, the individual light emitter assemblies 10 are spaced apart to enhance air circulation. A cavity 103 extends completely through the center of the lantern emitter unit 101 in a vertical direction.

Figure 6:
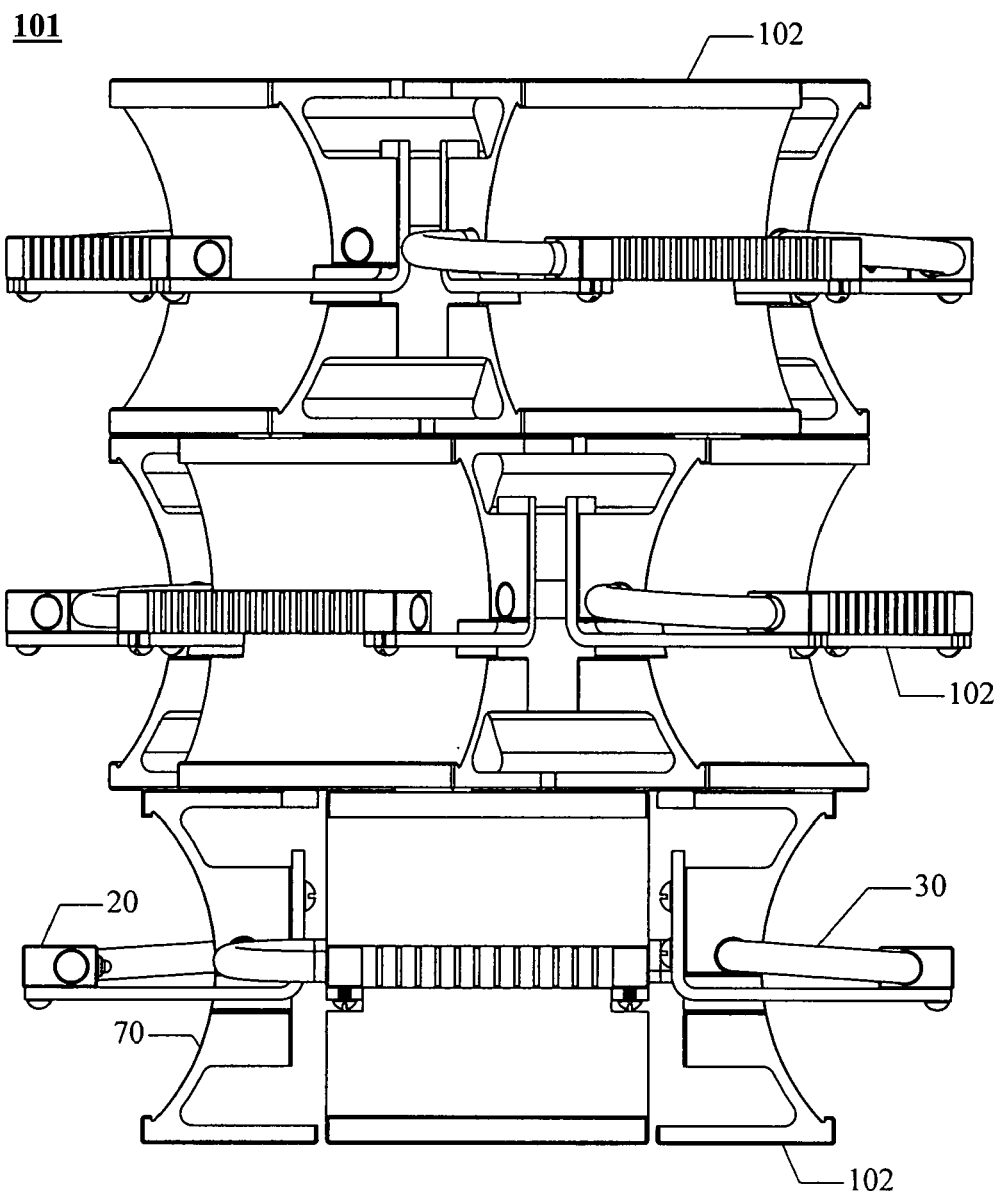
FIG. 6 is a horizontal view of the light emitter unit of FIG. 5.

The lantern emitter unit 101 of FIGS. 5 to 7 is made of three separate tiers 102 with each tier having four individual light emitter assemblies 10. The lower tier 102 is fixedly attached to a horizontal mounting surface of a lantern structure by means of connector screws 80 engaged through the mounting slots 51 of the lower flanges 50 of the reflector mounting blocks 40 of the individual light emitter assemblies 10. The heads of the screws 80 bear against the upper surfaces of the lower flanges 50 of the mounting blocks 40, so that the lower horizontal surfaces of the flanges are fixedly pressed against the mounting surface in the lantern structure.

The second tier 102 is similarly attached to the upper flanges 55 of the reflector mounting blocks 40 of the lower tier by threadedly engaging connector screws 80 into pairs of the drilled and tapped holes 56 of the upper flanges 55 of the lower tier mounting blocks 40. The central vertical axis of the second tier is coaxial with the corresponding axis of the first tier 102 and is rotated by 30 degrees relative to the first tier. The third tier 102 is similarly mounted to the upper flange of the second tier, but is rotated by 60 degrees relative to the first tier. The attachment of the tiers 102 is such that an individual light emitter assembly 10 in a lower tier is connected by connector screws 80 to at least two different light emitter assemblies in an adjacent upper tier. This type of connection rigidizes the structure of the lantern emitter unit 101 and also permits conductive transfer of heat between the reflector assemblies of the connected tiers. FIG. 6 shows a side profile view of the assembled lantern emitter unit 101.

Figure 8:
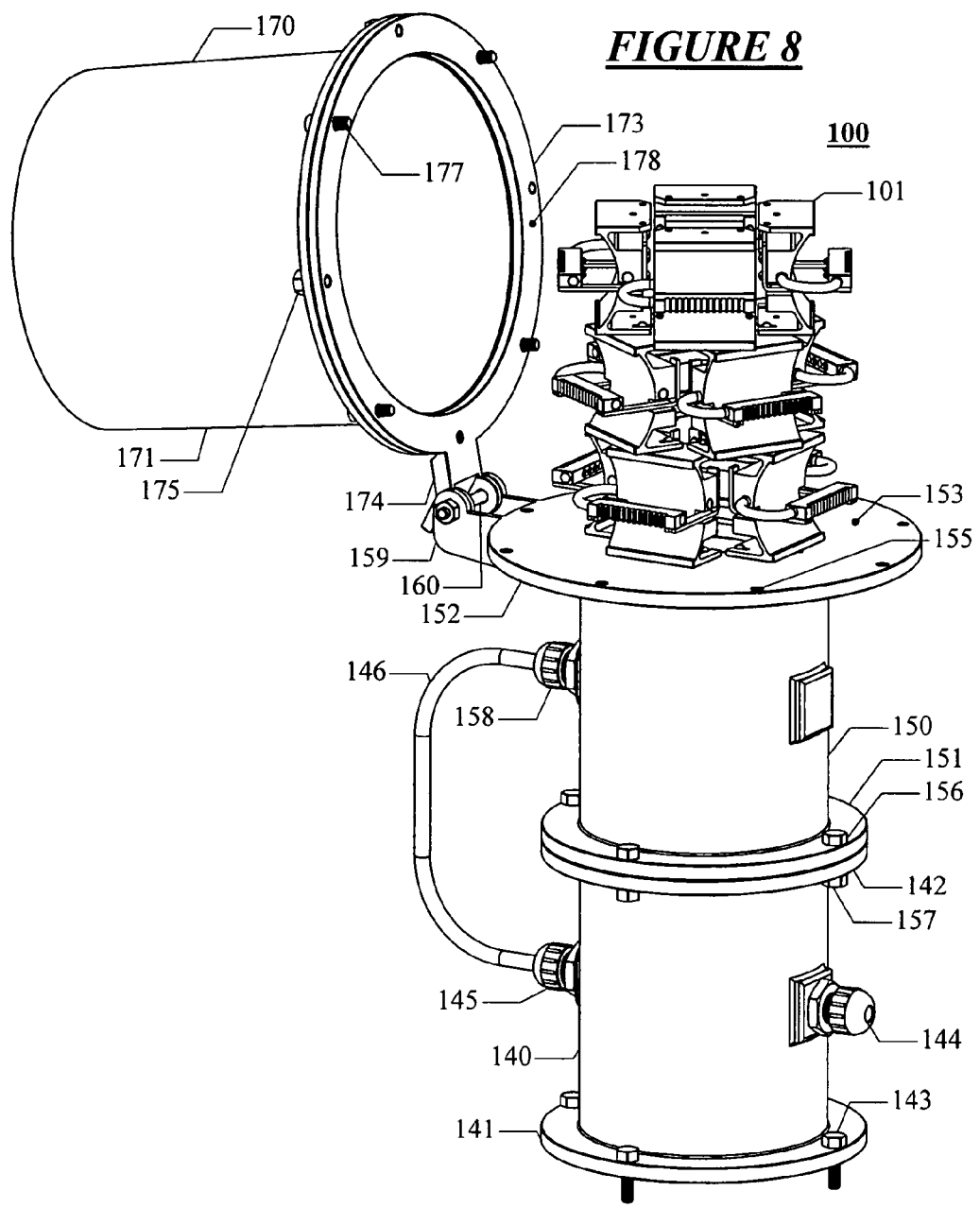
FIG. 8 is an oblique view of the light emitter unit of FIGS. 5, 6, and 7 installed in a lantern assembly, wherein the lens assembly of the lantern is shown in its open condition.

FIG. 8 shows the lantern emitter unit 101 attached to a lantern structure to form a first embodiment of a lantern 100. The lantern structure consists of a lower base 140 and an upper base 150. The lower and upper bases 140 and 150, respectively, have outwardly extending transverse flanges on right circular cylindrical tubes having a common vertical axis.

The lower base 140 has a bottom flange 141 and an upper flange 142, with each having a regular circular pattern of bolt holes. Mounting screws 143 are engaged through the bolt hole circle of the bottom flange in order to attach the lantern 100 to a suitable support structure (not shown). An inlet fitting 144 for an electrical power cord is radially positioned at an intermediate height of the lower base 140, and a similar outlet fitting 145 is positioned on the opposite side of the lower base. Power from batteries or another suitable power source (not shown) is transmitted to electrical control and power conditioning hardware mounted inside the lower base 140 by a power cord (not shown) entering inlet fitting 144. Power to operate the lantern emitter unit 101 is then transmitted to the upper base 150 by means of jumper cord 146 extending from the outlet fitting 145.

The upper base 150 has a bottom flange 151 and an enlarged upper flange 152, with each having a regular circular pattern of bolt holes. The upper base 150 has mounting screws 156 engaged through the bolt hole circle of the bottom flange in order to attach to the lower base 140. The upper flange 152 of the upper base 150 extends partially into the bore of the tube to form a horizontal mounting surface 153 having a central hole 154. Eight drilled and tapped mounting holes 155 are provided on mounting surface 153 in a regularly spaced pattern of four pairs of holes for being threadedly engaged by the connector screws 80 of the lower tier of the lantern emitter unit 101. Additionally, a regularly spaced circular drilled and tapped bolt hole pattern is provided in the mounting surface 153 for engagement of the cover mounting screws 177 used to attach the lens unit 170 to the upper base 150.

An inlet fitting 158 for a jumper cord 146 is radially positioned at an intermediate height of the upper base 150. Control circuitry (not shown) fed by the jumper cord 146 is mounted within the bore of the upper base 150 and is connected by wire pairs (not shown) extending through central hole 154 to each of the LEDs 22 of the lantern emitter unit 101. The lower flange 151 of the upper base 150 is connected to the upper flange 142 of the lower base 140 by means of mounting screws 156 and hex nuts 157. The upper flange 152 of the upper base 150 is provided with a trunnion type hinge bracket 159 radially positioned at the outer edge of the flange. The hinge bracket 159 mounts a hinge pin 160.

The lens unit 170 for the lantern 100 consists of a lens with a support ring 173 at its base. Lens 171 is a body of revolution about a vertical axis and is constructed of transparent material such as plexiglas or glass. The lens is thin walled with an outwardly extending narrow bottom flange, a slowly tapering frustroconical central section of constant wall thickness, a strongly tapering upper frustroconical section closing the top, and an upwardly extending projection, commonly referred to as a bird spike 172. The flange of the lens unit 170 has a regularly spaced array of an even number of bolt holes which permit its mounting to the support ring 173 by means of lens attachment screws 175. A lens attachment screw 175 is positioned in every other bolt hole of the flange.

The support ring 173 has a radially positioned hinge bracket 174 engagable by the hinge pin 160 and the hinge bracket 159 of the upper base 150 so that the lens unit 170 can be pivotably attached to the lantern structure. The body support ring 173 is a relatively thin planar annular circular ring structure comateable with the flange of the lens 171 and having a regularly spaced array of drilled holes corresponding to the holes of the lens 171. Alternating holes are tapped for engagement of the lens attachment screws 175 so that the lens 171 is fixedly mounted to the support ring. The other holes in both the flange of the lens 171 and the support ring are coaxial and untapped so that cover mounting screws 177 can be extended through the holes to fixedly mount the lens unit 170 to the mounting surface 153 of the upper base 150. A concentric elastomeric annular ring gasket 178 is provided to seal between the support ring 173 and the mounting surface 153 of the upper base 150.

Figure 9:
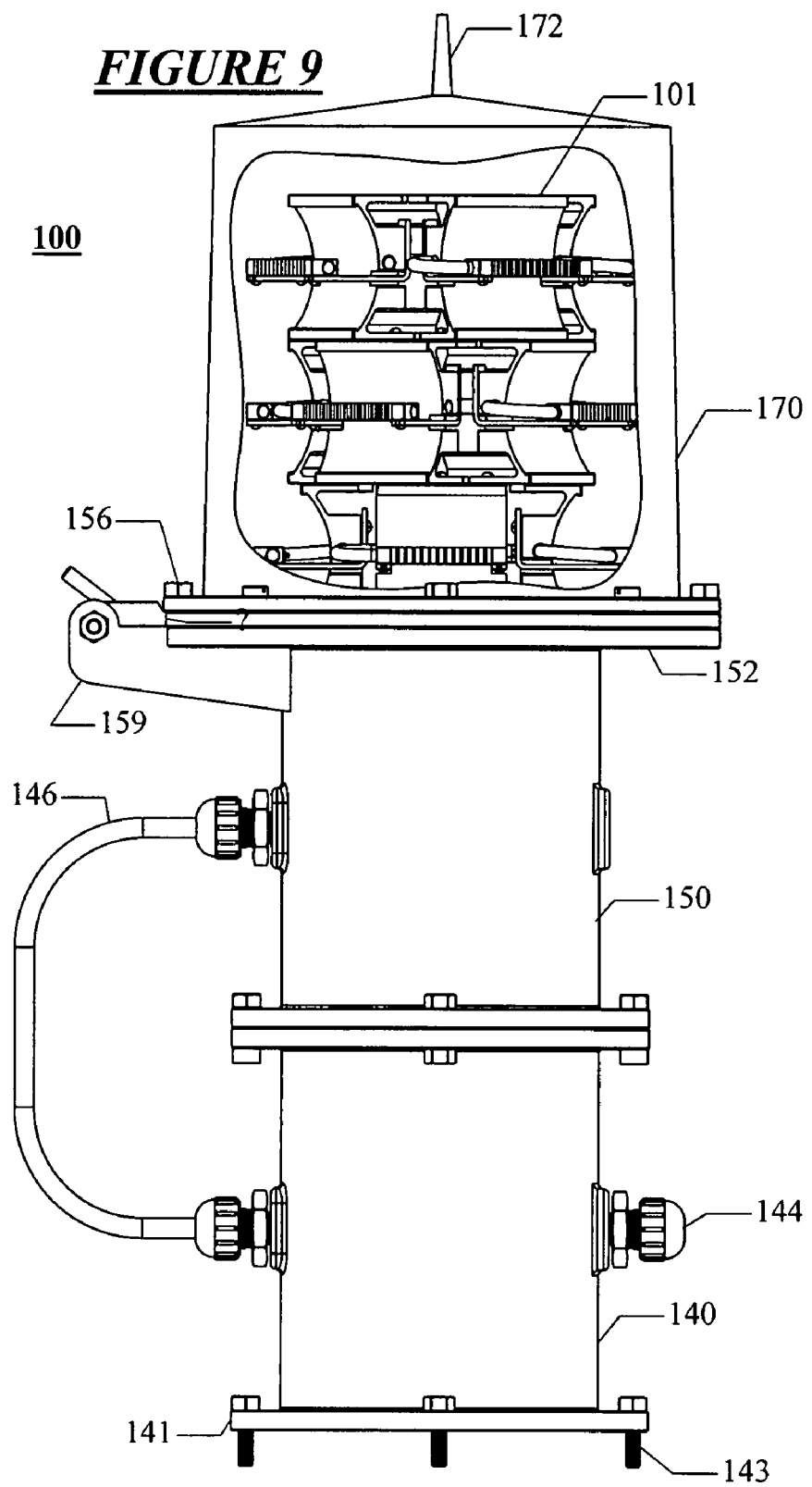
FIG. 9 is a side profile view of the lantern assembly of FIG. 8, wherein the lens assembly of the lantern is closed. The lens is partially cut away in order to shown the relationship of the light emitter unit to the lantern.

FIG. 8 shows the lantern 100 with its lens unit 170 pivoted about the hinge pin 160 so that the lantern emitter unit 101 can be serviced. FIG. 9 shows the lens unit in its closed and sealed operating position on the lantern 100. The lens 171 is partially cut away to show how the lantern emitter unit 101 is positioned therein.

Figure 10:
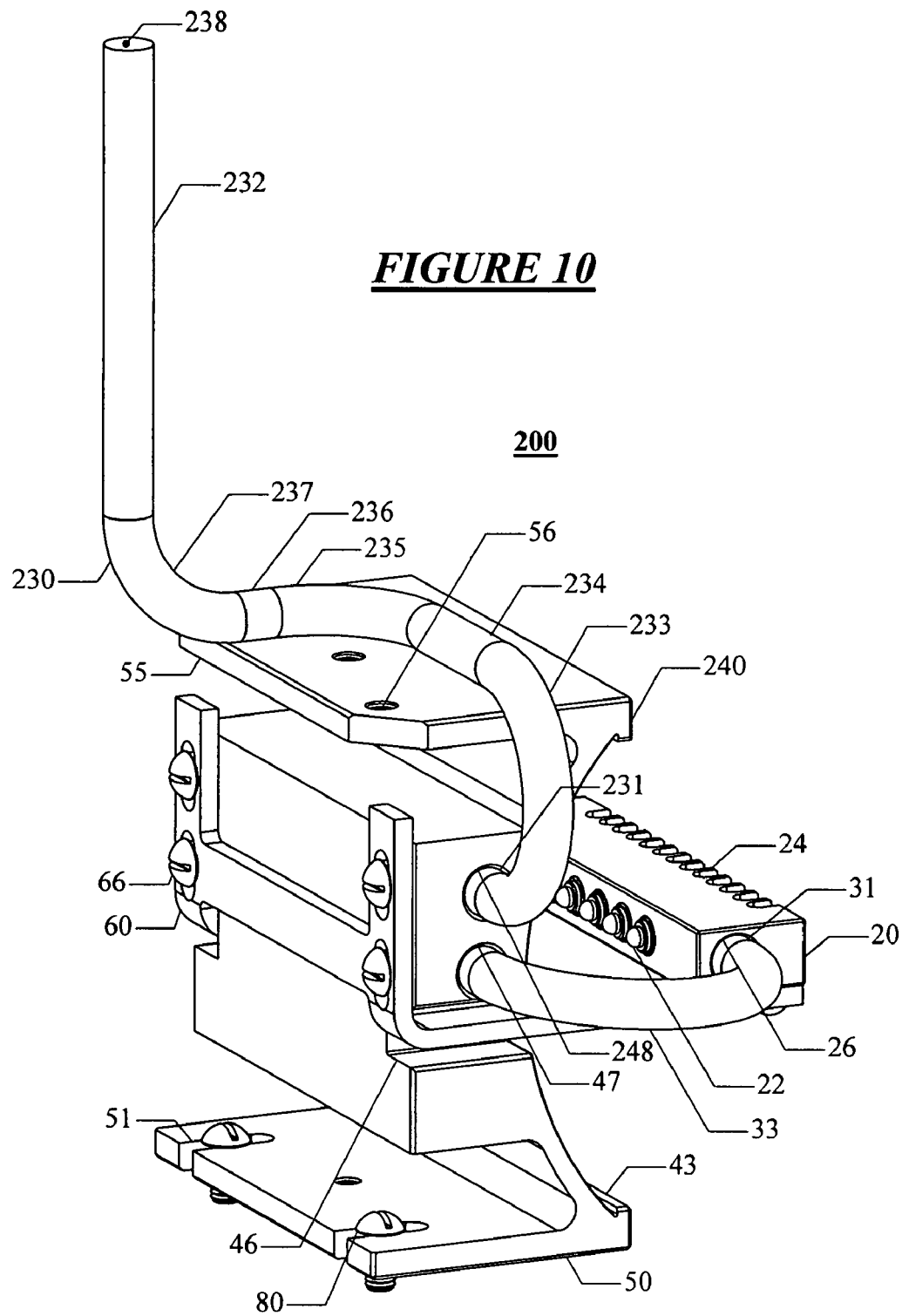
FIG. 10 is an oblique view of a second embodiment of the light emitter assembly.

FIG. 10 shows an alternate second embodiment 200 of the light emitter assembly, wherein the reflector mounting block 240 is provided with a secondary heat pipe 230 for conveying heat from block 240 to a radiator 380 which is mounted external to the lens unit 370 of the second embodiment 300 of the lantern. The reflector mounting block 240 is identical in all respects to the reflector mounting block 40 with the exception of its being provided with a bore 248 for the mounting of the absorber end 231 of the secondary heat pipe 230. The bore for the secondary heat pipe 248 is a close slip fit to the absorber end of the secondary heat pipe. The bore 248 is parallel to and slightly offset upwardly from the bore 47 for the primary heat pipe. As before, suitable thermally conductive material may be interposed between the secondary heat pipe 230 and the bore 248.

Figure 11:
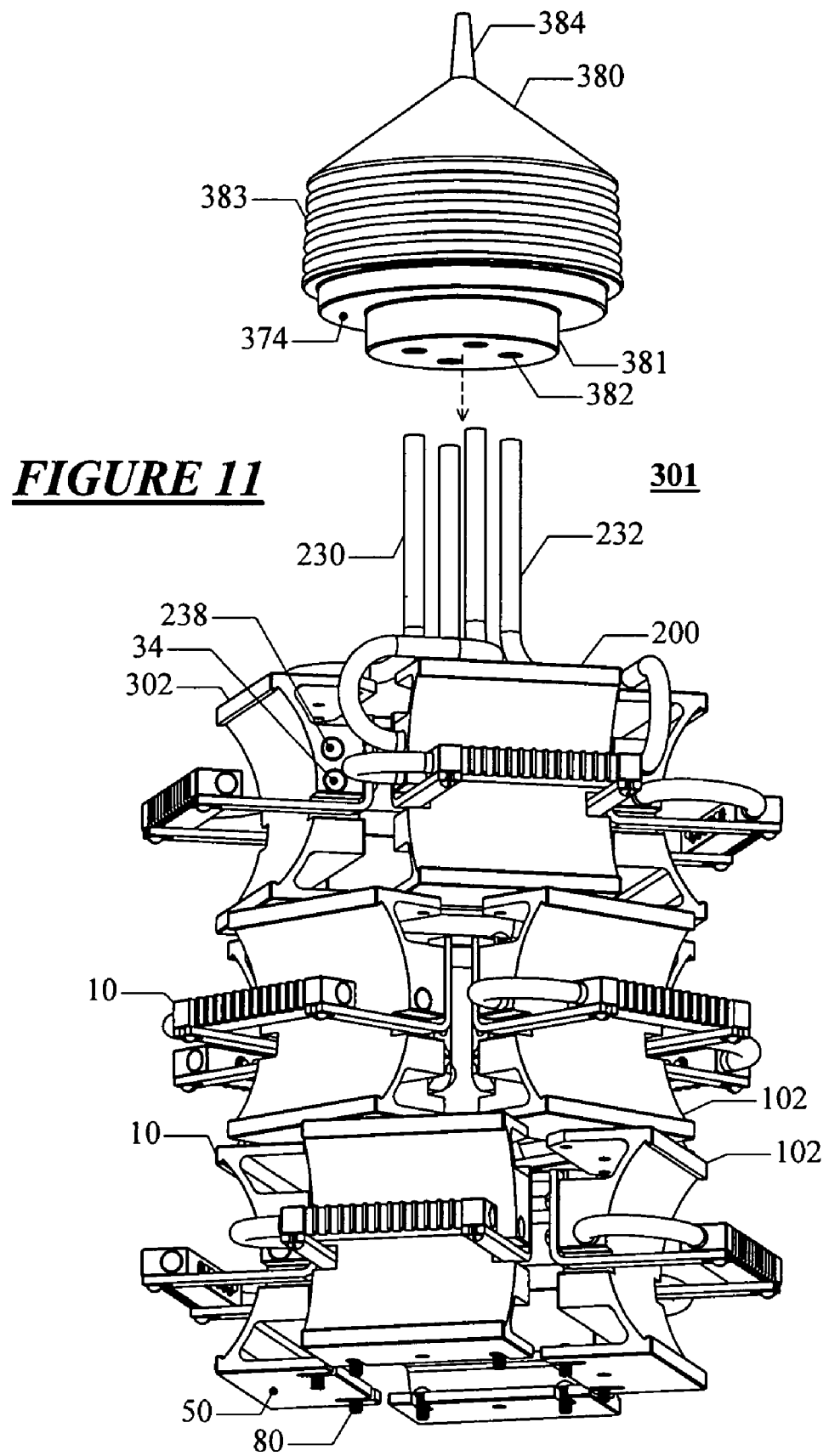
FIG. 11 is a partially exploded oblique view of a second embodiment of the light emitter unit having an external heat radiator.
Figure 12:
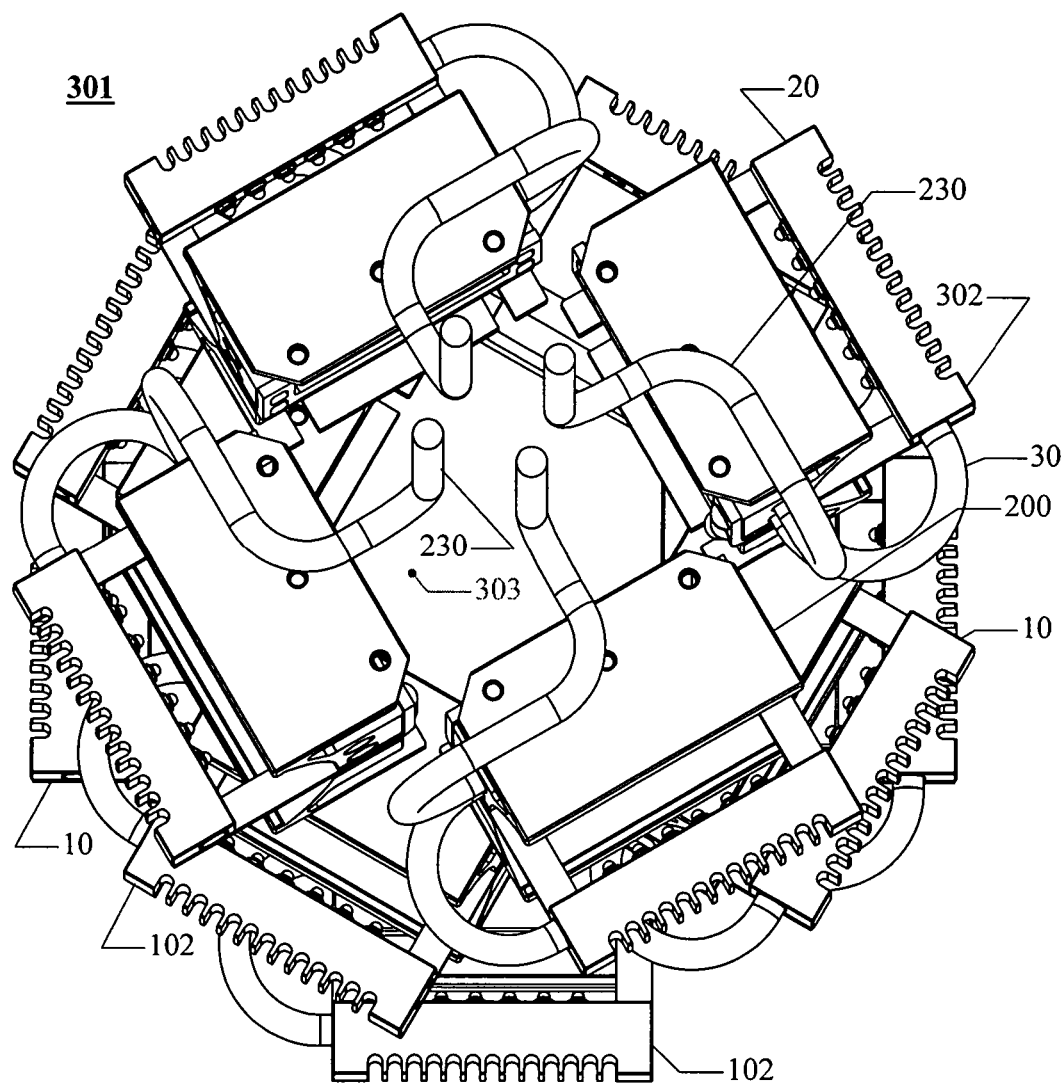
FIG. 12 is an oblique view looking down on the light emitter unit of FIG. 11. The radiator of the second embodiment light emitter unit is omitted for clarity.
Figure 13:
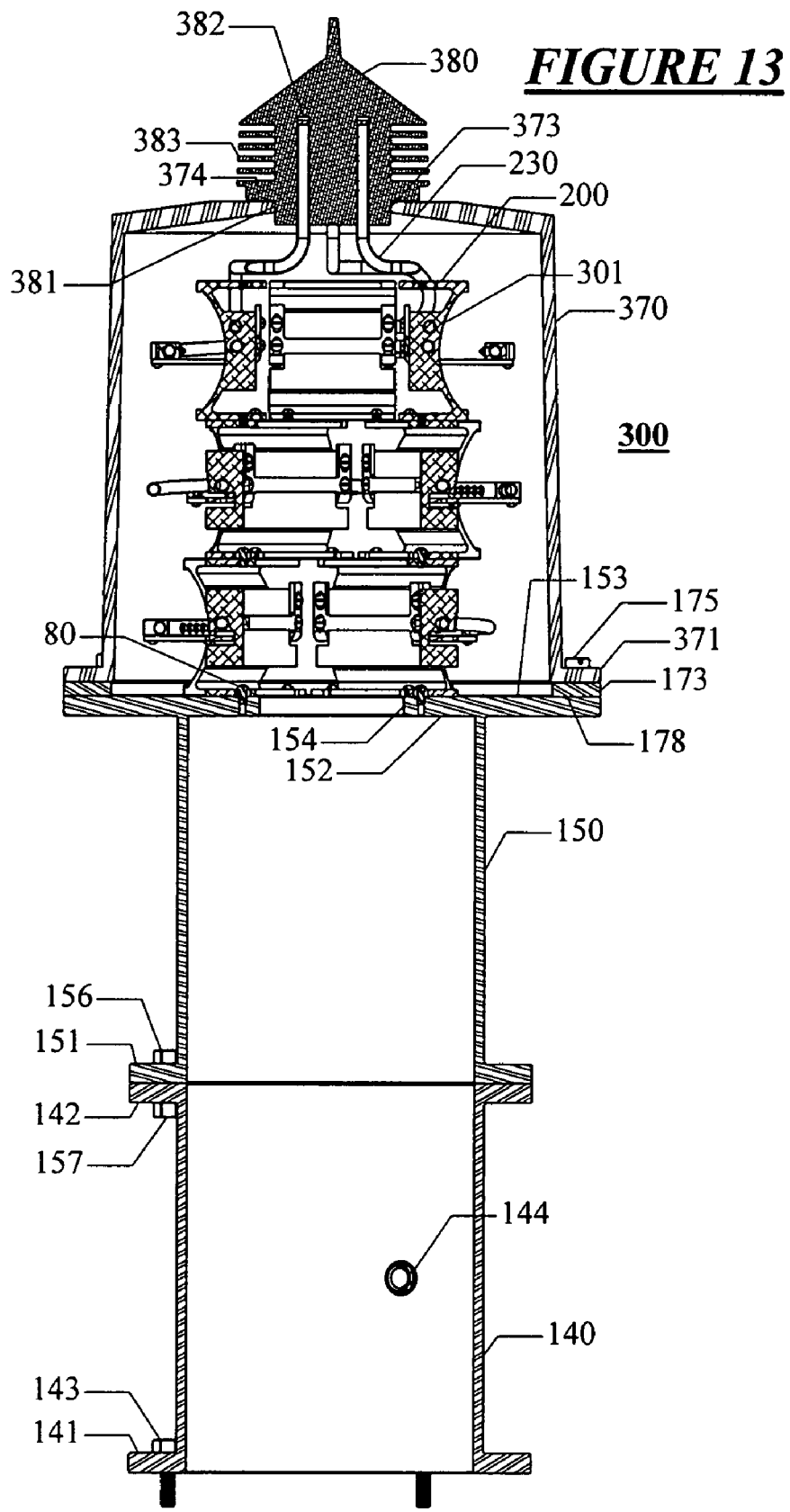
FIG. 13 is a vertical longitudinal axis sectional view taken through a second embodiment of the lantern assembly which utilizes the light emitter unit of FIG. 11.

The secondary heat pipe 230 is constructed similarly to the primary heat pipe 30 with a heat absorber end 231 and a heat rejection 232, but the tubular structure may have multiple bends, rather than a single bend. For example, the embodiment of the secondary heat pipe 230, illustrated in FIGS. 10-12, includes from its horizontal absorber end 231, a vertical first connecting 180 degree elbow 233, a horizontal first linear segment 234 parallel to the heat absorber end, a horizontal second connecting 90 degree elbow 235, a short horizontal second linear segment 236, a vertical third 90 degree connecting elbow 237, and a vertically upwardly extending heat rejection end 232. The distal ends of the heat pipe 230 are closed by transverse end caps 238. The heat rejection end 232 is located on the vertical midplane of the reflector mounting block 240.

With the exception of the inclusion and accommodation of the secondary heat pipe 230, the second embodiment 200 of the light emitter assembly is substantially similar to the first embodiment of the light emitter assembly 10.

The second embodiment 301 of the lantern emitter unit is identical to that of the first embodiment 101, with the exception that the upper tier 302 of the lantern emitter unit 301 has a tier constructed of four of the second embodiment 200 of the light emitter assemblies. This embodiment may be used in very warm environments or for applications where the lantern is on continuously. The attachments of the tiers 102 and 302 and the spacings of the light emitter assemblies 200 are similar to those for the first lantern emitter unit 101. This can be seen clearly in FIGS. 11 and 12. For lantern emitter unit 301, the heat rejection ends 232 of the secondary heat pipes 230 mounted in the second embodiments 200 of the light emitter assemblies in the upper tier 302 project upwardly above the cavity 303 in the center of the lantern emitter unit 301.

In order to effectively utilize the heat rejection capabilities of the secondary heat pipes 230, they must convey the heat to a location external to the lens unit 370 of the second embodiment of the lantern 300. This is accomplished by inserting the heat rejection ends 232 of the heat pipes 230 into a radiator that rejects heat to the exterior of the lantern.

Radiator 380, one embodiment of such a radiator, has a vertical axis of symmetry and consists of, starting at its lower end, a centralizing boss 381, a vertically extending cylindrical core having multiple external horizontal cooling fins 383, and a conical cap with an upwardly extending projection or bird spike 384. The centralizing boss 381 is a short right circular cylindrical disk of smaller diameter than the fins of the radiator. The centralizing boss 381 is attached to the downwardly facing lower side of the first fin 383. An annular flat sealing gasket 374 is fitted to the lower side of the first fin 383 and is coaxially placed around the centralizing boss 381. Four vertically extending heat pipe sockets 382 are drilled in a hole circle at 90 degree spacings so that the heat rejection ends 232 of the secondary heat pipes can be inserted with a close slip fit.

The lens unit 370 for lantern 300 is substantially identical to the lens unit 70 of the first embodiment of the lantern 100, with the exception that the lens 371 is provided with an upwardly opening central hole 373 and an upper horizontal flat surface for engagement of the gasket 374. The central hole 373 is a close fit to the centralizing boss 381 of the radiator 380 and the gasket 374 is used to seal between the radiator 380 and the upper flat surface surrounding the central hole 373.

The lantern 300 differs from the first lantern 100 only in the lens unit 370 and in the lantern emitter unit 301. Having the heat rejection ends 232 of the secondary heat pipes 230 extend into the radiator 380 permits lantern 300 to reject its heat externally in a direct manner.

Figure 14:
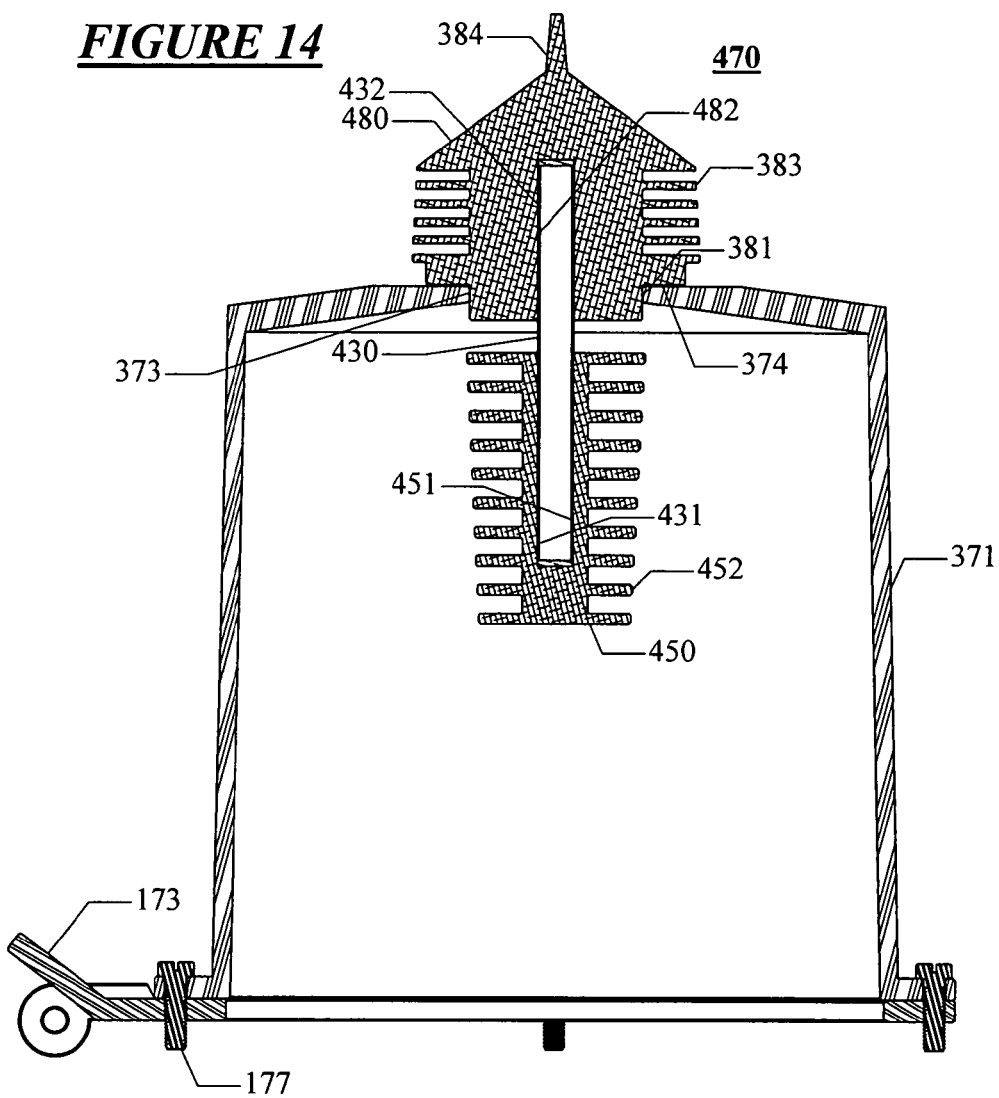
FIG. 14 is a vertical centerline sectional view of a third embodiment of the lens assembly, wherein a heat pipe with both a heat absorber and an external radiator are incorporated into the lens assembly.

FIG. 14 shows a third embodiment 470 of the lens unit suitable for use with the lantern 100 as a replacement for the lens unit 170. The lens unit 470 is similar to the lens unit 370 used with the second embodiment 300 of the lantern, with the exception that an integral heat absorber 450, a single large capacity heat pipe 430, and a radiator 480 are mounted in place of the radiator 380. The heat pipe 430 is a straight tubular structure and is sized to reject by itself the excess heat from the lantern light unit 100. The heat absorber end 431 of the heat pipe 430 is socketed in a vertical tubular heat absorber having multiple horizontal fins 452 extending along its length and an upwardly opening vertical bore 451 with a close slip fit to the heat pipe 430. The heat absorber 350 is disposed within the cavity 103 of the lantern emitter unit 101 and is totally enclosed within the lens unit 370. As before, thermally conductive media is used between the heat pipe and its mounting bores.

Radiator 480 is substantially similar to radiator 380, with the exception that it has a single upwardly extending heat pipe socket 482 located on its vertical centerline. The upper end of heat pipe 430 serves as the heat rejection end 432 and is engaged with a close slip fit with the central socket 482 of the radiator 480. The radiator 470 is mounted onto the lens 371 in the same manner as the radiator 380, with gasket 374 sealing between the bottom annular surface of the radiator and to the upper surface of the lens 371.

Figure 15:
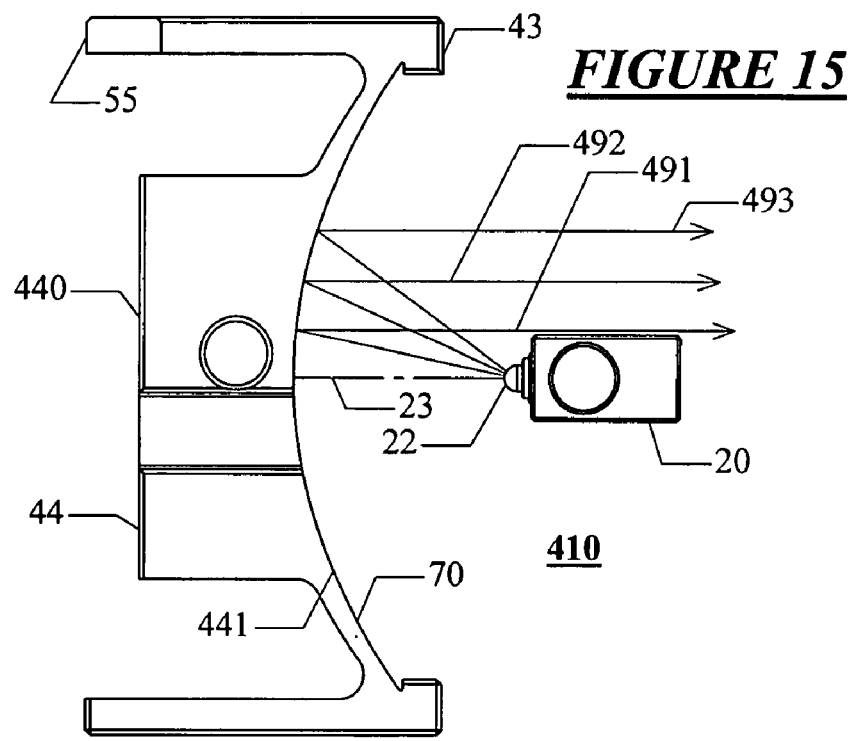
FIG. 15 is a view corresponding to that of FIG. 3, but showing light paths for rays for a parabolic reflector mounting block used with the light emitter assembly, wherein the LEDs are positioned at the focal point of the parabola.

Referring to FIG. 15, a third embodiment of a light emitter assembly 410 is shown in a side profile view. The heat pipe and mounting hardware are removed so that the light ray paths can be shown clearly. Light emitter assembly 410 is substantially similar to light emitter assembly 10, but with the difference that the reflector arcuate cylindrical face 441 of the reflector mounting block 440 has a parabolic cross-section. In all other respects, the features of the components of the light emitter assembly 410 are the same as those for light emitter assembly 10.

For light emitter assembly 410, the LEDs 22 are positioned so that their centers lie on the focal point of the parabola of the reflector mounting block 440. Light emitted from the LEDs 22 is reflected from the mirror 70 which closely conforms to the substantially parabolic face of the reflector mounting block 440 and which is retained by the retainer lips 43. The properties of a parabolic reflector are such that light emitted at the focal point of the reflector is reflected parallel to the vertical plane of symmetry of the reflector. Thus, as seen in FIG. 15, light rays 491, 492, and 493 emitted by the LEDs 22 are reflected parallel to the horizontal midplane of the mirror 70 and the horizontal projection of the axis of symmetry 23 for the LEDs.

It should be noted that the reflector face 441 of the reflector mounting block 440 can be selectively inwardly offset from a true parabolic profile by the thickness of the mirror 70. By doing this, the reflective face of the mirror 70 is held in a true parabolic profile. However, this modification is typically not necessary, as the LEDs are not point light sources and the thickness of the mirror 70 is only on the order of 0.004 inch (0.1 mm). Accordingly, the amount of light deviated from the desired horizontal emission path is relatively very small if the reflective face of the mirror 70 deviates slightly from a true parabolic profile.

Figure 16:
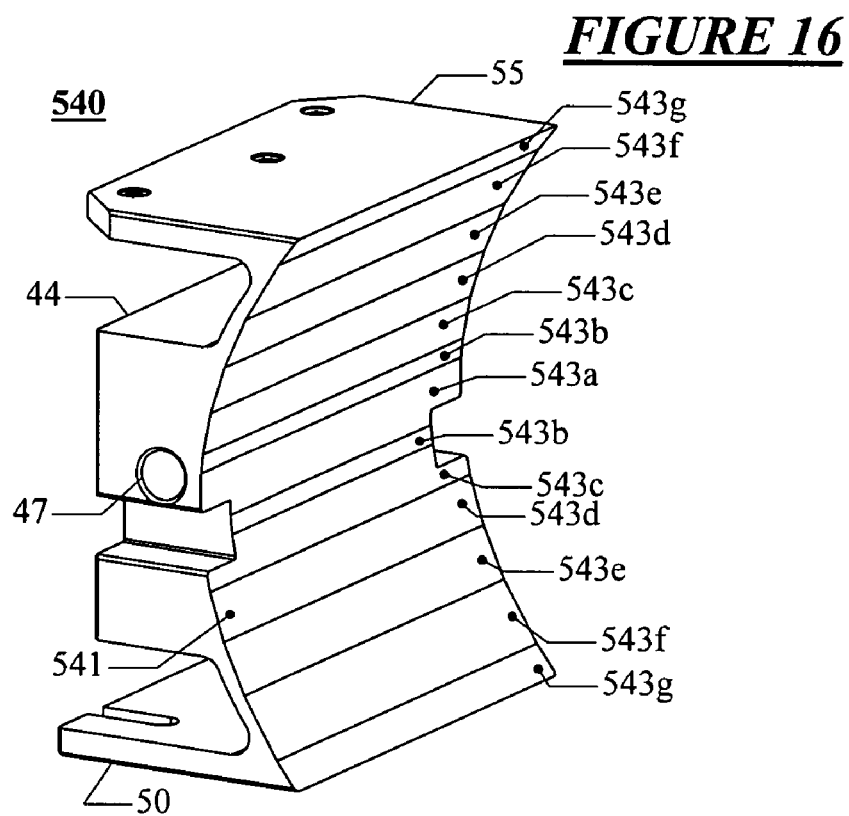
FIG. 16 is an oblique view of a reflector mounting block wherein the reflector is composed of an array of planar facets parallel to the array of LEDs.
Figure 17:
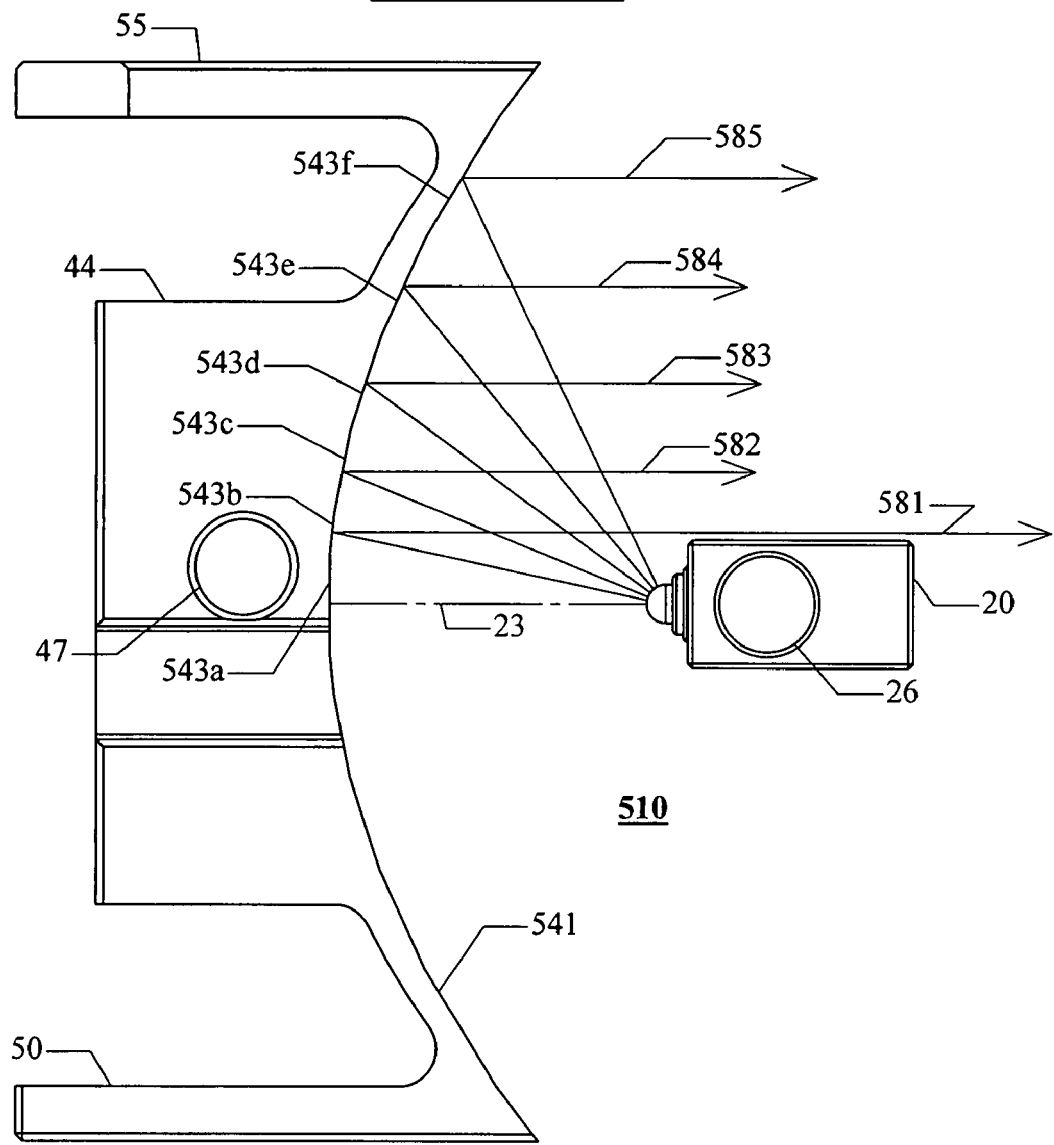
FIG. 17 is a view corresponding to FIGS. 3 and 15, but showing light paths for rays for the faceted reflector mounting block of FIG. 16.

FIG. 16 shows an oblique view of a fourth embodiment of a reflector mounting block 540. For this mounting block, the structure is substantially similar to that of the first embodiment reflector mounting block 40 with the exception that the reflector face 541 is composed of multiple planar strips 543a-g that intersect at their edges. The planar strips 543a-g form a continuous prismatic cylindrical surface symmetrical about the horizontal midplane of the reflector mounting block 540 and with each planar strip parallel. Additionally, rather than using a separate mirror 70, the reflector face is polished by electropolishing, direct polishing or lapping, or the application of a sputtered reflective layer. The angle of each strip 543a-g with respect to the vertical backplane of midbody 44 is equal to half of the strip midpoint angle of incident light from the LEDs with the horizontal midplane of the block 540. Thus, light impinging on a reflective strip 543a-g is reflected out horizontally or nearly horizontally by the reflector face 541. FIG. 17 shows how sample light ray paths 581 to 585 emitted from the center of the LEDs 22 and incident on the midpoints of the planar strips 543b, c, d, e, and f, respectively.

Figure 21:
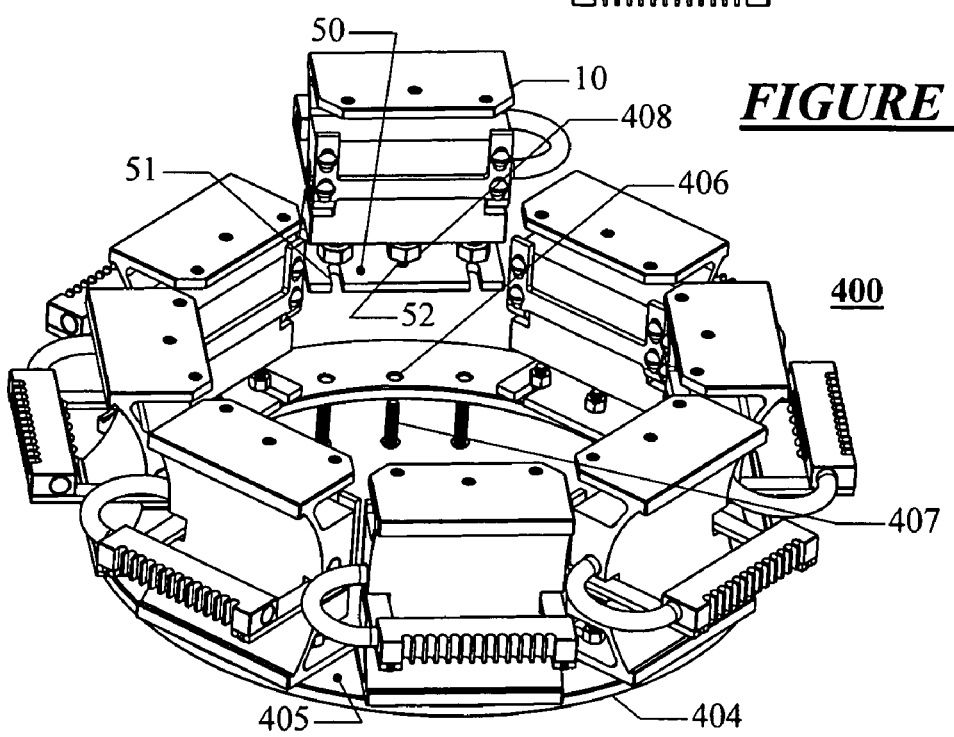
FIG. 21 is an oblique partially exploded view of the single-tier light emitting system embodiment of FIG. 17.

Referring to FIGS. 20 and 21, a third embodiment 400 of a light emitter system is shown. The light emitter system 400 consists of eight light emitting assemblies 10 angularly equispaced in a horizontally outwardly facing array which is mounted on the upper horizontal surface 405 of an annular mounting ring 404. Mounting ring 404 is a thin planar plate ring having a large central hole as shown herein. Mounting ring 404 has an angularly equispaced array of eight sets of mounting holes 406, each set having three mounting holes.

Round head mounting screws 407 extend upwardly through the mounting holes 406, where they engage either the mounting slots 51 or the midplane mounting hole 52 in the lower mounting flange 50 of the reflector mounting block 40 of a light emitting assembly 10. Hex nuts 408 are threadedly engaged with the mounting screws 407 to clamp against the upper surface of the lower mounting flange 50 so that the alignment of the light emitting assemblies 10 is ensured.

OPERATION OF THE INVENTION

The operation of the different embodiments of the present invention, namely the light emitter assemblies 10, 200, 410 and 540, the lantern emitter units 101 and 301, and the lanterns 100, 300 and 400, is similar between the different options for the various embodiments.

The LEDs 22 generate a considerable amount of heat. Dissipating this heat away from the light source (LEDs 22) is important to the performance and lifetime of the light emitter assemblies. The LEDs of the light source of most of the embodiments of the invention are mounted on one or more thermally conductive supports. Each thermally conductive support is typically provided with a heat pipe for transferring heat absorbed from the LEDs away from the support to a relatively cooler space. This heat transfer appreciably reduces the operating temperature of the LEDs, thereby prolonging the life time of the LEDs. The transferred heat can be transferred by the heat pipe directly to the atmosphere exterior of the cover or housing of the light source, to a second element of the assembly of the light source, or to the housing itself.

The various embodiments described above dissipate the generated heat in several ways. For example, the light emitter 10 mounts the LEDs 22 on a heat-conducting LED mounting block 20 which acts as a direct heat sink for the LEDs. The LED mounting block (heat sink) 20 absorbs the heat from the LEDs 22 and both dissipate the heat into the environment and, primarily, to the heat absorber end 31 of the heat pipe 30, so that it can be transmitted to the body of the reflector mounting block 40. The heat dissipation losses of the LED mounting block 20 to the environment are aided by the provision of the cooling fins 24.

The heat pipe 30 very efficiently conveys heat to its heat rejection end 32 engaged in the reflector mounting block 40, so that most of the heat generated by the LEDs is removed therefrom. This cooling of the LEDs 22 both increases their service life and light production efficiency. To increase heat dissipation away from the mounting block 40, ambient external air is encouraged to circulate around and away from the mounting block by the open structure of the light emitter units 101 and 301.

Typically, the LED mounting block 20 and the reflector mounting block 40 are made of aluminum with high thermal conductivity, which draws the heat from the LEDs 22 and readily permits the emission of heat from the blocks by both radiation and convection. This is meant by way of example and is not intended to limit the scope of the invention, as a variety of other heat conductive materials can also be used.

The operation of the light emitter assemblies is primarily concerned with the ray paths of the light emitted by the array of multiple LEDs 22. Basically, the reflective surface 71 receives the light rays emitted by the LEDs 22 and reflects most of the light rays into an almost horizontal beam substantially parallel to the optical axis of the LEDs 22 and directed towards the intended illumination area.

The variations in the mirror or reflective surface shown are meant as examples and are not meant to limit the scope of the invention. For instance, an ellipse, parabola, hyperbola or other shape of reflective surface, including non-2nd order curves, can replace the right circular cylindrical surface of mirror 71. Two-dimensional tailoring algorithms also can be used to define an arcuate face curve yielding a substantially horizontal emission of light.

FIG. 3 indicates a computer simulated projection of the light rays emitted by the LEDs 22 onto the vertical midplane of the light emitter assembly 10. Because the reflective surface 71 of the mirror 70 does not have a parabolic profile, but is a right circular cylindrical surface instead, the light reflected from the mirror and not reabsorbed by either the LEDs 22 or the mounting face 21 of the LED mounting block 20 is not emitted in parallel horizontal rays. However, the reflected rays do not diverge widely from a parallel horizontal condition.

The center of the LEDs 22 is not located at the center 42 of the arcuate face of the mirror 70. Rather, the center of the LEDs is located on the horizontal midplane of the light emitter assembly 10 between the mirror 70 and the center 42 of the arcuate face of both the mirror 70 and the reflector mounting block 40. As seen in FIG. 3, the center of the light generating surface of the LEDs 22 is located at a distance X from the center 42 of the right circular cylindrical mirror. The light emitted by the LEDs 22 reaches the reflective surface 71 of the mirror 70 at a local incident angle with the normal to the mirror surface at the point of impingement. The impinging ray then is reflected in an outward direction (i.e., back in the general direction of the LEDs) so that the angle between impinging and reflected rays is about twice the local incident angle.

Light emitted directly along the LED axis of symmetry encounters the mirror 70 with a zero angle of incidence and is reflected directly back upon the LED 22. Similarly, light emitted at an angle of less than 11 degrees with the horizontal midplane of the light emitter assembly 10 will impinge either on the LEDs 22 or on the mounting surface 21 for the LEDs. However, an exception to this occurs for laterally reflected rays which may escape past the transverse ends of the LED mounting block 20.

As seen in FIG. 3, first light beam path 81 has a departure angle of about 12 degrees from both the horizontal midplane of the light emitter assembly and also from the source LED axis of symmetry. The reflected light beam path 81 is nearly horizontal and is able to pass beyond the LED mounting block 20. Likewise, the reflected light beam paths 82 and 83, which leave the LEDs 22 respectively at approximately 24 degrees and 36 degrees respectively from the horizontal, are also reflected from mirror 70 at angles such that the reflected beams are nearly horizontal. This close convergence of the reflected light rays with the horizontal midplane of the light emitter assembly 10 is achieved by careful selection of the distance X.

Referring to FIG. 4, the projection onto the horizontal midplane of the light emitter assembly 10 for the rays emitted by the LEDs 22 is indicated. Because the mirror reflective surface 71 is cylindrical, the impinging light rays from the LEDs 22 are reflected back upon the mounting face of the LED mounting block 21 or onto the LEDs themselves unless they are emitted at a sufficiently wide angle from the axis 23 of the source LED. However, many or most of the impinging rays will have been emitted at an angle from the horizontal sufficient that they will be reflected above or below the LED mounting block 20. Thus, most of the light emitted by the LEDs 22 is reflected past the LED mounting block 20 and is close to horizontal.

As can be seen in FIG. 4, sample light rays 84, 85, and 86 are emitted by LEDs 22 in the horizontal plane. Because of their azimuthal angles of emission relative to the LED axis of symmetry, light rays 84, 85 and 86 are reflected by reflective surface 71 to pass horizontally by the end of the LED mounting block 20. These rays and other emitted rays, having some lateral displacement and some amount of vertical displacement from the horizontal midplane of light emitter assembly equal to or greater than zero, will be reflected substantially into the horizontal plane by mirror 71. For the reflected rays which do not impinge on the LED mounting block 20, their lateral angle of divergence from the vertical midplane of the light emitter assembly 10 is equal to the horizontal component of the angle of their divergence from the axis of their source LED. This lateral divergence, taken with the lateral divergence of the adjacent light emitter assemblies 10, aids in providing the substantially uniform light emission between adjacent emitter assemblies, as seen in FIG. 19.

The amount of light escaping from the light emitter assembly 10 and its ray paths is complicated by the fact that the LEDs 22 are not point sources, but rather have finite planar light emission surfaces. Additionally, the intensity of light emission is reduced for increasing angle of light ray departure from the axis 23 of symmetry for each LED 22. The use of an appropriate lens mounted directly over the light emitting surface of an LED 22 can favorably distribute light rays from the LED further from the LED axis so that more light can escape past the LED mounting block 20.

Figure 18:
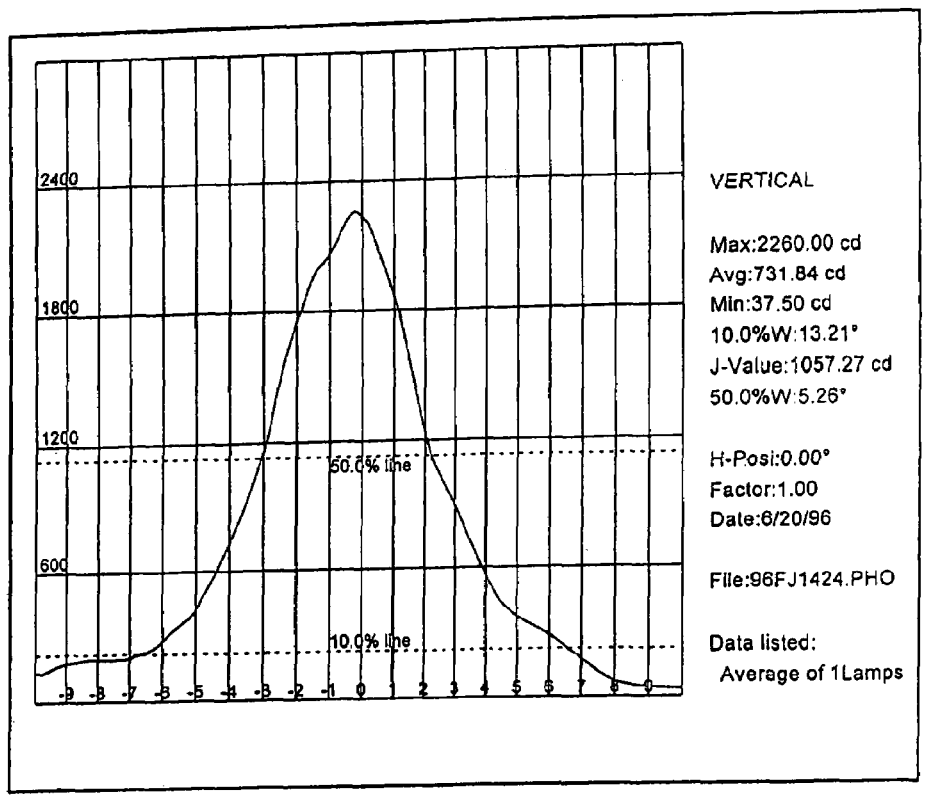
FIG. 18 illustrates the variation of light output from a lantern of the present invention as a function of angle above or below the horizontal midplane of the lantern.

FIG. 18 is the result of a photometric measurement of the variation of light output from a prototype lantern 100 as a function of angle above or below the horizontal midplane of the lantern. The lens 171 has a frustroconical thin optical transmitting surface of uniform thickness, so that it does not appreciably alter the ray paths of light passing through from the light emitter assemblies 10 of the lantern emitter unit 101 of the lantern 100. The vertical intensity variation measurements shown in FIG. 18 indicate a very good convergence into the horizontal plane of the emitted light beam.

Figure 19:
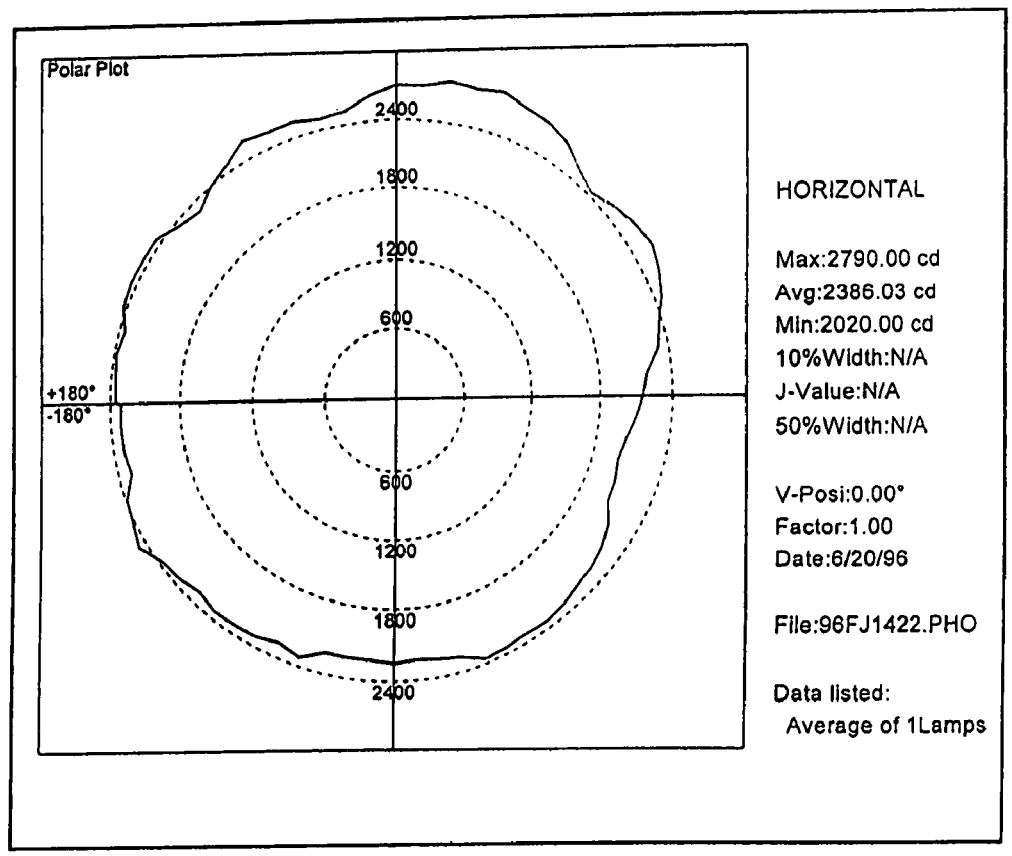
FIG. 19 illustrates the variation of emitted light intensity from a lantern of the present invention taken in the horizontal plane as a function of azimuthal position.

Referring to FIG. 19, the variation of emitted light intensity taken in the horizontal plane as a function of azimuthal position is shown for the same lantern 100. The results show that the azimuthal output variation is minor. This minimal deviation from uniformity for the lantern azimuthal light output is a consequence of both the lateral spreading of the light emissions from the horizontally extending array of multiple LEDs 22 by the mirror 70 of each light emitter assembly 10 and also the provision of twelve separate light emitter assemblies 10 positioned at 30 degrees spacings about the vertical axis of the lantern 100. The light emission properties of the lantern emitter units 101 and 301 are substantially identical because of their identical light emission and reflection structures and properties.

When the light emitter units are assembled into tiered groups, a more uniform and more powerful azimuthal light emission pattern results when the individual tiers emit light in spaced-apart planes. However, because the light from a lantern 100 is meant to be visible at a distance several orders of magnitude larger than the tier-to-tier spacings, the vertical dispersion of light from the horizontal primary plane of emission for the individual tiers substantially results in a uniform vertical emission pattern for the lantern.

The surface of the mirror 70 can be readily flexed to conform to the surface of the parabolic or near parabolic arcuate face 441 of the reflector mounting block 440 as shown in FIG. 15. Use of the parabolic face increases the amount of light emission from a lantern for a given amount of light output from the LEDs 22. However, because the LEDs are not a point source, the light is not all emitted in a horizontal direction, since a large amount of the light from each LED is emitted off the centerline 23 of the LED and hence is not emitted at the focal point of the parabolic or near parabolic reflective surface. However, light intensity readings taken for both vertical and circumferential dispersion indicate a high degree of circumferential uniformity and satisfactory light concentration in the horizontal plane for the first embodiment lantern configuration 100 using the substantially parabolic arcuate face 441.

The reflective surface 541 of the reflector block 540 is polished so that a separate mirror 70 is not required for good reflectivity. Use of a conformable mirror is not practical with the angularity of the face 541. This approach can also be used in place of a mirror 70 for any of the light emitter assemblies 10, 200, or 410. Because the LEDs 22 are not point sources, use of the prismatic reflective surface 541 does not result in excessive divergence of the light output of the light emitter assembly 510 so long as the number of prismatic surfaces 543 is sufficiently large. For the limiting case of a very large number of prismatic surfaces 543, the reflective surface 541 approaches a parabola in profile.

The focusing by each of the light emitter assemblies 10, 200, 410, and 540 of the light from the LEDs 22 into a coherent horizontal beam permits the use of a plain nonprismatic lantern lens 170 or 370. A plain lantern lens provides substantially no lensaic properties, so that it does not appreciably alter the light which passes through it. The function of the lantern lenses of the present invention is to serve as an environmental protector for the lantern emitter units. This use of a plain lantern lens offers considerable economy in contrast to conventional beacon lanterns, which use light sources which do not have good horizontal light focusing.

The light source can be a single LED 22 light-source or, as shown, a plurality of individual LEDs 22 in a linear configuration on the mounting block 20. Likewise, the light source may be constructed with basically any number of light emitting assemblies, such as the four shown in the first embodiment of the lantern emitter unit 101 or the eight shown in the light emitter unit 400. Furthermore, either one tier of light emitting assemblies such as illustrated in the light emitter system 400, or multiple tiers of light emitting assemblies as shown for the other lantern assemblies may be used in order to increase light output.

The flow of heat for several of the different lantern embodiments is described below. Heat generated by the LEDs 22 is largely absorbed by the LED mounting blocks 20, although a significant amount is spread through the entire upper portion of the lanterns by radiation and convection.

The heat absorbed by the LED mounting blocks 20 is continuously absorbed in turn by the heat absorber ends 31 of the primary heat pipes 30. Through fluid evaporation, transportation, condensation, and return flow, the heat pipes 30 are able to transfer heat from their absorber ends 31 to their heat rejection ends 32. Because the heat rejection ends 32 of the heat pipes are in close contact with their mounting bores 47 in the reflector mounting blocks 40 or 240, most of the heat transferred by the heat pipes 30 is transferred to the blocks 40 and 240.

The escape of transferred heat from the reflector mounting block 40 occurs through convection, radiation, and conduction to contacting parts. The transferred heat from the reflector mounting block 40 primarily winds up in the air inside the lens assembly 170 of the lantern 100. In warm climatic conditions, it is possible to have internal temperatures inside the lens assembly 170 sufficiently high that the light output efficiency of the LEDs 22 of the lantern 100 is undesirably reduced. Additionally, the higher operating temperatures will shorten the service life of the LEDs.

Use of the secondary heat pipe 230 permits removal of more heat from the reflector mounting blocks 240 and its conveyance by means of the heat pipe 230 to the externally exposed radiator 380. Heat transferred by a heat pipe 230 is readily rejected to the ambient air external to the lantern 300 by the finned and externally exposed radiator 380. As a consequence, the temperature in the interior of the lens unit 370 and around the LEDs 22 is reduced to acceptable levels.

The lens unit 470 is intended for use with the lantern 100 as a replacement for the original embodiment of the lens assembly 170 used with that lantern. The lens unit 470 shown in FIG. 14 is provided with a heat absorber 450 which absorbs heat from the air in the central cavity of the lantern emitter unit 101. The centrally mounted heat pipe 430 in turn absorbs heat from the heat absorber 450 and transmits it to the upper end of the heat pipe 430, where the heat is transferred to the externally mounted radiator 480. Since the radiator 480 is exposed to the ambient air outside the lens unit 470, it readily rejects heat to the ambient air, thereby reducing the temperature internal to the lens unit 470 and also for the LEDs 22

The embodiments of lanterns 100, 300, and 400 are meant by way of example and are not meant to limit the scope of the invention. For instance, more sophisticated heat sinks can be used, such as those with tapered or more complex fins to enlarge the surface area or improve heat absorption or rejection. Air turbulence due to thermally induced air circulation within the lenses does not appreciably affect the optical performance of the lanterns.

ADVANTAGES OF THE INVENTION

The embodiments of the lantern described herein have numerous advantages over lanterns currently available. For example, the arrangement of the reflector assembly provides for excellent focusing of the light from the LEDs into a horizontal beam having substantially uniform circumferential intensity. In fact, the lantern produces enough uniform circumferential intensity that a non-lensaic lantern lens can be used, leading to manufacturing economies. In addition, the use of reflecting surfaces or supports for conformable thin reflecting surfaces that can be made of simple extrusions without the need for critical reflecting surface tolerance control leads to a simplification of the manufacturing process.

The lantern provides a major improvement in LED efficiency and life by reducing the LED temperature through the removal of heat through a heat dissipation system, including cooling fins on the LED mounting block and the inclusion of one or more heat pipes.

Although the present invention and its advantages have been described in detail, it should be understood that various changes, substitutions and alterations can be made herein without departing from the spirit and scope of the invention as defined by the appended claims.

What is claimed is:

1. A light emitter assembly comprising:
   (a) a light source mounting block, wherein the light source mounting block has a plurality of cooling fins;
   (b) a light source mounted on the light source mounting block;
   (c) a heat dissipation system in communication with the light source mounting block to transfer heat away from the light source; and
   (d) a reflector assembly for receiving an unfocused beam of light emitted by the light source and reflecting a focused beam of light away from the reflector assembly.

2. The light emitter assembly of claim 1, wherein the light source has an optical axis and the reflector assembly reflects the focused beam of light substantially parallel to the optical axis.

3. The light emitter assembly of claim 2, wherein the beam avoids encountering the light source.

4. The light emitter assembly of claim 1, wherein the light source is a light emitting diode.

5. The light emitter assembly of claim 1, having a plurality of light sources mounted in a linear array on the light source mounting block.

6. The light emitter assembly of claim 1, wherein the reflector assembly includes a reflective surface and a reflector mounting block.

7. The light emitter assembly of claim 6, wherein the reflective surface is arcuate.

8. A light emitter assembly comprisng:
(a) a light source mounting block;
(b) a light source mounted on the light source mounting block;
(c) a heat dissipation system in communication with the light source mounting block to transfer heat away from the light source; and
(d) a reflector assembly including an arcuate reflective surface and a reflector mounting block wherein the arcuate reflective surface is symmetrical about a horizontal midplane, the horizontal midplane is coincident with an optical axis of the light source, and the midplane of the arcuate reflective surface is perpendicular the optical axis.

9. The light emitter assembly of claim 5, wherein the reflector assembly has a reflective surface having an array of planar facets parallel to the linear array of light sources.

10. The light emitter assembly of claim 1, wherein the light source mounting block is made of a thermally conductive material to transfer heat away from the light source.

11. A light emitter assembly comprising:
(a) a light source mounting block;
(b) a light source mounted on the light source mounting block;
(c) a reflector assembly for receving an unfocused beam of light emitted by the light source and reflecting a focused beam of light away from the reflector assembly; and
(d) a heat dissipation system in communication with the light source mounting block to transfer heat away from the light source, wherein the heat dissipation system transfers heat from the light source mounting block to the reflector assembly.

12. The light emitter assembly of claim 11, wherein the heat dissipation system includes a heat pipe in communication with the reflector assembly.

13. The light emitter assembly of claim 12, wherein one end of the heat pipe is thermally coupled to the light source mounting block and a second end of the heat pipe is thermally coupled to the reflector assembly.

14. The light emitter assembly of claim 11, wherein the heat dissipation system includes a heat pipe having a heat absorbing end traversing the light source mounting block and a heat rejection end engaged in the reflector assembly for transfering heat away from the light source.

15. A lighting device comprising:
(a) a plurality of light emitter assemblies, wherein the light emitter assembly comprises:
(i) a light source mounting block;
(ii) a light source mounted on the light source mounting block;
(iii) a reflector assembly for receiving a plurality of light rays emitted by the light source and reflecting the light rays away from the reflector assembly; and
(iv) a heat pipe, wherein one end of the heat pipe is thermally coupled to the light source mounting block and a second end of the heat pipe is thermally coupled to the reflector assembly;
(b) a mounting surface having the light emitter assemblies equidistantly disposed on the mounting surface; and
(c) an air circulation path in communication with the light emitter assemblies.

16. The lighting device of claim 15, wherein the mounting surface is a body of revolution and the light emitter assemblies are disposed in a radial array about a vertical axis of the mounting surface.

17. The lighting device of claim 15, having a plurality of mounting surfaces with the mounted light emitter assemblies vertically stacked.

18. The lighting device of claim 15, wherein the light emitter assembly further includes a second heat pipe having one end thermally coupled to the reflector assembly and a second end in the thermal communication with the air circulation path.

19. The lighting device of claim 15, wherein the one end of the heat pipe is a heat absorbing end traversing the light source mounting block and the second end is a heat rejection end engaged in the reflector assemlby for transfering the heat away from the light source.

20. A lighting device comprising;
(a) a light source mounting block:
(b) a light source mounted on the light source mounting block;
(c) a reflector assembly for receiving a plurality of light rays emitted by the light source and reflecting the light rays away from the reflector assembly; and
(d) a heat dissipation system in communication with the light source mounting block to transfer heat away from the light source, wherein the heat dissipation system includes
(i) a first heat pipe having a heat absorbing end traversing the light source mounting block and a heat rejection end engaged in the reflector assembly,
(ii) a plurality of cooling fins on the light source mounting block,
(iii) an air circulation path in communication with the light source mounting block, the light source, and the reflector assembly, and
(iv) a second heat pipe in thermal communication with the reflector assembly and the air circulation path.

21. The lighting device of claim 15, further comprising a transparent cover enclosing the light emitter assemblies.

22. The lighting device of claim 20, further comprising a thermally conductive projection exposed to ambient air outside the cover, wherein the projection is in thermal communication with the heat dissipation system.

23. The lighting device of claim 18, further comprising a transparent cover enclosing the mounting surface and the light emitter assemblies and a thermally conductive projection exposed to ambient air outside the cover, wherein the projection is in communication with the second heat pipe.

24. A lighting device comprising:
(a) a plurality of coaxially aligned light source units, each light source unit including
(i) a plurality of light emitter assemblies, wherein each light emitter assembly has a light source mounting block, a light source mounted on the light source mounting block, and a reflector assembly having a reflective surface, whereby the reflective surface receives a plurality of light rays emitted by the light source and reflects the light rays into a substantially horizontal beam away from the reflector assembly, and (ii) a mounting surface having the light emitter assemblies equidistantly disposed about a vertical axis of the mounting surface;

(b) an air circulation path in communication with the light source units; and (d) a heat dissipation system in communication with the light source mounting blocks and the air circulation path for transferring heat away from the light source, wherein the heat dissipaton system comprises:

(i) a plurality of first heat pipes, wherein one first heat pipe transfers heat from the light source mounting block to the reflector assembly of each light emitter assembly, (ii) a plurality of cooling fins on the light source mounting block of each light emitter assembly, wherein the cooling fins are in communication with the air circulation path, and (iii) a plurality of second heat pipes, wherein one second heat pipe transfers heat from the reflector assembly of each light emitter assembly to the air circulation path.

25. The lighting device of claim 24, wherein a heat absorbing end of each first heat pipe traverses each light source mounting block.

26. The lighting device of claim 24, wherein a heat absorbing end of each second heat pipe traverses each reflector assembly and a heat rejection end extends into the air circulation path.

27. The lighting device of claim 24, further comprising a transparent cover enclosing the light source units and a thermally conductive projection exposed to ambient air outside the cover, wherein the projection is in communication with the heat dissipation system.

28. The lighting device of claim 24, wherein the light source is a plurality of light emitting diodes.

29. A light emitter assembly comprising:

(a) a light source mounting block;

(b) a light source mounted on the light source mounting block;

(c) a heat dissipation system in communication with the light source mounting block to transfer heat away from the light source;

(d) a reflector assembly for receiving an unfocused beam of light emitted by the light source and reflecting a focused beam of light away from the reflector assembly; and (e) a heat pipe, wherein one end of the heat pipe is thermally coupled to the light source mounting block and a second end of the heat pipe is thermally coupled to the reflector assembly.

* * * * *